US012801956B2

(12) United States Patent
Cox et al.

(10) Patent No.: US 12,801,956 B2
(45) Date of Patent: Nov. 17, 2026

(54) SYSTEMS AND METHODS FOR ACOUSTIC FEATURE EXTRACTION AND DUAL SPLITTER MODEL

(71) Applicant: Covid Cough, Inc., Greenwood Village, CO (US)

(72) Inventors: Morgan Cox, Lakewood, CO (US); Nolan Donaldson, Englewood, CO (US); Mark Fogarty, Seneca, SC (US); Kristan S. Hopkins, North Andover, MA (US); John Kattirtzi, Greenwood Village, CO (US); Julia Komissarchik, Draper, UT (US); Edward Komissarchik, Draper, UT (US); Simon Kotchou, Phoenix, AZ (US); Robert F. Scordia, Ridgewood, NY (US); Adam Stogsdill, Cypress, TX (US)

(73) Assignee: Covid Cough, Inc., Greenwood Village, CO (US)

( * ) Notice: Subject to any disclaimer, the term of this patent is extended or adjusted under 35 U.S.C. 154(b) by 677 days.

(21) Appl. No.: 18/315,849

(22) Filed: May 11, 2023

(65) Prior Publication Data

US 2023/0368000 A1 Nov. 16, 2023

Related U.S. Application Data

(60) Provisional application No. 63/340,550, filed on May 11, 2022.

(51) Int. Cl.
*G06N 7/01* (2023.01)
*G06N 3/0464* (2023.01)
(Continued)

(52) U.S. Cl.
CPC ............ *G06N 7/01* (2023.01); *G06N 3/0464* (2023.01); *G06N 3/08* (2013.01); *G10L 25/27* (2013.01); *G10L 25/30* (2013.01); *G10L 25/66* (2013.01)

(58) Field of Classification Search
CPC .......... G06N 3/0464; G06N 3/08; G06N 7/01; G10L 25/27; G10L 25/30; G10L 25/66
See application file for complete search history.

(56) References Cited

U.S. PATENT DOCUMENTS 5,199,077 A 3/1993 Wilcox et al.
5,660,176 A 8/1997 Iliff
(Continued)

FOREIGN PATENT DOCUMENTS

CA 2810457 C * 11/2018 ............ G10L 15/16
CN 108766419 B 10/2020
(Continued)

OTHER PUBLICATIONS

Alqudaihi et al., "Cough Sound Detection and Diagnosis Using Artificial Intelligence Techniques: Challenges and Opportunities", IEEE Access, vol. 9, pp. 102327-102344 (Year: 2021).
(Continued)

*Primary Examiner* — G. C. Neurauter, Jr.
(74) *Attorney, Agent, or Firm* — Greenberg Traurig, LLP; Kristopher Reichlen; David J. Dykeman

(57) ABSTRACT

Systems and methods of the present disclosure enable signal detection and/or recognition in audio recordings using one or more signal splitting techniques including a computing system configured therefor. The computing system may receive a signal data signature of time-varying data, the time-varying data having an event of interest and segment the signal data signature to isolate the event of interest by utilizing a first Hidden Markov model (HMM) configured to
(Continued)

segment the signal data signature into at least one segment of the time-varying data by identifying state changes indicative of events of interest and where the at least one segment of the time-varying data has a first length. The computing system may use a second HMM configured to segment the at least one segment into a sub-segment of the time-varying data by identifying state changes within the at least one segment.

20 Claims, 24 Drawing Sheets

(51) Int. Cl.

| | |
|---|---|
| ***G06N 3/08*** | (2023.01) |
| ***G10L 25/27*** | (2013.01) |
| ***G10L 25/30*** | (2013.01) |
| ***G10L 25/66*** | (2013.01) |

(56) References Cited

U.S. PATENT DOCUMENTS 5,983,178 A * 11/1999 Naito .................. G10L 15/07 704/256.4
6,436,057 B1 * 8/2002 Goldsmith ........... A61B 5/0823 600/529
6,963,835 B2 * 11/2005 Kimball .................. G10L 25/48 704/235
7,267,652 B2 * 9/2007 Coyle .................... A61B 5/725 600/529
7,386,453 B2 6/2008 Polanyi et al.
8,442,821 B1 * 5/2013 Vanhoucke ............. G10L 15/14 704/232
8,447,592 B2 * 5/2013 Edgington ............ G10L 13/033 715/767
9,015,093 B1 4/2015 Commons
9,020,816 B2 * 4/2015 McClain ................. G10L 17/26 704/226
9,418,059 B1 8/2016 Singliar et al.
9,734,824 B2 * 8/2017 Penn ....................... G10L 15/16
10,098,569 B2 10/2018 Abeyratne et al.
10,529,318 B2 * 1/2020 Kurata .................... G10L 15/16
10,796,714 B2 10/2020 Levanon et al.
10,796,805 B2 * 10/2020 Lotan ...................... G10L 25/15
11,062,725 B2 * 7/2021 Variani ................. G10L 19/008
11,110,239 B2 * 9/2021 Troxell ................. A61M 16/08
11,219,386 B2 * 1/2022 Lesso ................... A61B 5/6803
11,240,181 B1 2/2022 Nagaraja et al.
11,864,880 B2 * 1/2024 Abeyratne ........... A61B 5/0002
11,877,841 B2 * 1/2024 Song ...................... A61B 7/003
11,986,283 B2 * 5/2024 Peltonen .............. G06N 3/0499
12,070,323 B2 8/2024 Chou
12,315,530 B2 * 5/2025 Usvyat ..................... A61B 7/04
12,481,926 B2 11/2025 Ramirez et al.
12,488,805 B2 * 12/2025 Haimi-Cohen ........ G16H 50/70
12,518,206 B2 1/2026 Archuleta et al.
12,518,774 B2 * 1/2026 Haimi-Cohen ......... G10L 25/30
12,518,777 B2 1/2026 Ramirez et al.
12,645,940 B2 6/2026 Cox et al.
2004/0193419 A1 9/2004 Kimball et al.
2007/0026406 A1 2/2007 ElGhaoui et al.
2007/0276278 A1 11/2007 Coyle et al.
2008/0059152 A1 3/2008 Fridman et al.
2009/0125623 A1 5/2009 Garg et al.
2009/0311657 A1 12/2009 Dodelson et al.
2009/0312660 A1 12/2009 Guarino
2011/0125044 A1 * 5/2011 Rhee ...................... A61B 7/003 600/534
2012/0071777 A1 * 3/2012 MacAuslan .......... A61B 5/7282 600/529
2015/0073306 A1 * 3/2015 Abeyratne ............. G16H 50/30 600/586
2016/0045161 A1 * 2/2016 Alshaer .................. A61B 5/097 600/538
2016/0078167 A1 3/2016 Rosner et al.
2016/0246772 A1 8/2016 Hoover et al.
2017/0003948 A1 1/2017 Iyer et al.
2017/0180266 A1 6/2017 Frank et al.
2017/0278018 A1 9/2017 Winih et al.
2018/0060512 A1 3/2018 Sorenson et al.
2018/0182362 A1 6/2018 Li
2018/0350351 A1 * 12/2018 Kopys ..................... G10L 15/16
2019/0347557 A1 11/2019 Khan
2019/0348064 A1 11/2019 Lesso
2020/0008725 A1 1/2020 Bach et al.
2020/0015709 A1 1/2020 Peltonen et al.
2020/0027558 A1 1/2020 Abeyratne et al.
2020/0034553 A1 1/2020 Kenyon et al.
2020/0125706 A1 4/2020 Adir et al.
2020/0143267 A1 5/2020 Gidney
2020/0152330 A1 5/2020 Anushiravani et al.
2020/0193735 A1 6/2020 Jung et al.
2020/0210538 A1 7/2020 Wang et al.
2020/0234188 A1 7/2020 Maffei Vallim
2020/0323484 A1 10/2020 Aronovich et al.
2020/0327379 A1 10/2020 Dong
2020/0337625 A1 10/2020 Aimone et al.
2020/0381130 A1 12/2020 Edwards et al.
2020/0388287 A1 12/2020 Anushiravani et al.
2020/0411036 A1 12/2020 Daimo
2021/0005184 A1 * 1/2021 Rao ....................... G10L 15/187
2021/0049421 A1 2/2021 Tandecki et al.
2021/0076977 A1 3/2021 Abeyratne et al.
2021/0128074 A1 5/2021 Leydon
2021/0219893 A1 7/2021 Luz et al.
2021/0234668 A1 7/2021 Manamohan et al.
2021/0248517 A1 8/2021 Soppin et al.
2021/0298711 A1 9/2021 Miri et al.
2021/0338154 A1 11/2021 Abeyratne
2021/0357586 A1 11/2021 Archuleta
2021/0361227 A1 11/2021 Chou et al.
2022/0004935 A1 * 1/2022 Lakshmanan ............ G06N 7/01
2022/0027725 A1 1/2022 Nongpiur et al.
2022/0029986 A1 1/2022 Neumann
2022/0058339 A1 2/2022 Archuleta
2022/0067445 A1 3/2022 Archuleta et al.
2022/0122740 A1 4/2022 Nematiosseinabadi et al.
2022/0130415 A1 4/2022 Garrison et al.
2022/0215248 A1 7/2022 Ramirez et al.
2022/0293123 A1 9/2022 Ramirez et al.
2022/0300856 A1 9/2022 Archuleta et al.
2022/0309407 A1 9/2022 Ramirez et al.
2023/0329646 A1 10/2023 Zhou
2023/0368026 A1 11/2023 Cox et al.
2024/0127078 A1 4/2024 Elyaderani et al.
2025/0285640 A1 * 9/2025 Carmiel ................ G10L 13/033
2026/0088040 A1 3/2026 Ramirez et al.

FOREIGN PATENT DOCUMENTS

WO 2019155052 A1 8/2019
WO 2020051256 A1 3/2020
WO 2020069048 A1 4/2020
WO 2020104465 A1 5/2020
WO 2021119742 A1 6/2021
WO 2021119743 A1 6/2021
WO 2021253093 A1 12/2021
WO 2022051523 A1 3/2022
WO 2022091062 A1 5/2022
WO 2022147566 A1 7/2022
WO 2022192606 A1 9/2022
WO 2022198105 A1 9/2022
WO 2022204573 A1 9/2022
WO 2023220665 A1 11/2023
WO 2023220683 A1 11/2023
WO 2024059792 A1 3/2024

(56) References Cited

FOREIGN PATENT DOCUMENTS

| | | | | | |
|---|---|---|---|---|---|
| WO | 2024059796 A1 | | 3/2024 | | |
| WO | WO-2024161230 A1 | * | 8/2024 | ............. | G10L 25/30 |

OTHER PUBLICATIONS

He et al., "Read, Watch, and Move: Reinforcement Learning for Temporally Grounding Natural Language Descriptions in Videos", Proceedings of the AAAI Conference on Artificial Intelligence, vol. 33, No. 1, pp. 8393-8400, Jul. 17, 2019.
Huang et al., "SAP: Self-Adaptive Proposal Model for Temporal Action Detection Based on Reinforcement Learning", Proceedings of the AAAI Conference on Artificial Intelligence, vol. 32, No. 1, pp. 6951-6958, Apr. 27, 2018.
Brownlee: A Gentle Introduction to Imbalanced Classification (Year: 2020).
Chen: When Machine Learning Meets Blockchain 2018 (Year: 2018).
Guha: One Shot Federated Learning 2019 (Year: 2019).
Herresthal: Swarm Learning for Decentralized Confidential Clinical ML May 2021 (Year: 2021).
Herresthal: Swarm Learning privacy ML Disease Classification_ 2020 (Year: 2020).
Jackson: City of Jackson COVID19 Symptom Collector Chrysalis Partners Apr. 2020 (Year: 2020).
Jadon: What Happens When You Run a Computer Program 2020 Loading Programs into RAM (Year: 2020).
Kolding: Chrysalis Partners Launches Covid19 Symptom Collector_ Apr 2020 (Year: 2020).
Li: Explicit Inductive Bias for Transfer Learning CNNs 2018 (Year: 2018).
Liu: Bagging based ensemble transfer learning 2016 (Year: 2016).
Liu: Cough Detection Using Deep Neural Networks 2014 (Year: 2014).
Merriam Webster: Compendium Definition & Meaning 2024 (Year: 2024).
Tan: A Survey on Deep Transfer Learning 2018 (Year: 2018).
Weiss: A survey of transfer learning 2016 (Year: 2016).
Zhuang: Comprehensive Survey on Transfer Learning 2020 (Year: 2020).
International Search Report in International Application No. PCT/US2023/066864 mailed Sep. 13, 2023.
International Search Report in International Application No. PCT/US2023/066888 mailed Sep. 18, 2023.
International Search Report in International Application No. PCT/US2023/072499 mailed Dec. 12, 2023.
Ashby, "A Novel Cough Audio Pre-Processing and Segmentation Algorithm for COVID-19 Detection," University of Brighton, School of Architecture, Technology and Engineering, Bachelor of Science Thesis, Jun. 2, 2022, www.researchgate.net/profile/Alice-Ashby/publication/363057325.
Ashby et al., "Cough-Based COVID-19 Detection with Audio Quality Clustering and Confidence Measure Based Learning, Conformal and Probabilistic Prediction with Applications", Proceedings of Machine Learning Research, pp. 129-148, Aug. 30, 2022.
Zhang et al., "Novel COVID-19 Screening Using Cough Recordings of a Mobile Patient Monitoring System," 2021 43rd Annual International Conference of the IEEE Engineering in Medicine & Biology Society (EMBC). IEEE, pp. 2353-2357, Nov. 7, 2021.
International Search Report in International Application No. PCT/US2023/066888 mailed Jan. 24, 2024.
Al Texsoft. "MLOps: Methods and Tools of DevOps for Machine Learning." Jul. 23, 2020 Retrieved on Jun. 26, 2022 from <https://www.altexsoft.com/blog/mlops-methods-tools/> entire document.
Ratri et al., "A Comparative Study on Signature Recognition", IEEE, pp. 167-171, Nov. 8, 2014. Retrieved from the Internet: Ratri et al., "A Comparative Study on Signature Recognition", IEEE, https://ieeexplore.ieee.org/stamp/stamp.jsp?tp=&arbynber=7065735.
Rodriguez et al. "Hybrid analysis pipelines in the REANA reproducible analysis platform." EPJ Web of Conferences. vol. 245. EDP Sciences, 2020. Nov. 16, 2020. Retrieved on Jun. 26, 2022 from <https://www.epj-conferences.org/articles/epjconf /abs/2020/21 / epjconf _ chep2020 _ 06041 /epjco nf_chep2020_06041.html> entire document.
Shen, "Movements Classification of Multi-Channel sEMG Based on CNN and Stacking Ensemble Learning" Special Section on Smart Health Sensing and Computational Intelligence: from Big Data to Big Impacts. IEEE Access, vol. 7, pp. 137489-137500, Oct. 3, 2019.
Stewart "Software as a Medical Device (SAMO): Clinical Evaluation—Guidance for Industry 1-20 and Food and Drug Administration Staff" U.S. Department of Health and Human Services, Food and Drug Administration, Dec. 8, 2017, Retrieved on Jun. 26, 2022 from <https://www.fda.gov/files/medical% 20devices/publish_ed/Software-as-a-Medical-Device-%28SAMD% 29-Clinical-Evaluation-Guidance-for-Industry-and-Food-and-Drug-Administration-Staff.pdf> entire document.
Teyhouee, "Cough Detection Using Hidden Markov Models" arxiv. Arxiv.org. Apr. 28, 2019 DOI: ARXIV:1904.12354v1.

* cited by examiner

General purpose and background for the component:

1. The splitting methods help segment the audio files into individual cough segments
2. This helps standardize the audio analysis
3. Analysis is done on an individual audio segment Problems faced that the component aims to fix:

1. Data is not standardized, this makes it difficult to compare various files to one another. For example If one sample has 5 coughs in it and another has 10 coughs in it, comparing the two files directly is not a fair comparison, since one has more samples than the other.
2. Removal of non-coughs in the audio segments How this component is a solution:

1. Burst Splitter - attempts to split the audio based off of RFFT in a provided range. The method calculates the start and end of a burst segment in the audio sample
2. SVM - svm is an unsupervised learning method. It attempts to draw relations between cough segments and non-cough segments within the audio sample. This provides method to segment the audio into "cough like samples" and non cough like samples From FIG. 12A-1

General purpose and background for the component:

Problems faced that the component aims to fix:

How this component is a solution:

FIG. 12A

From FIG. 12A-1

General purpose and background for the component:
1. The smaller cough detector is trained on smaller cough samples so it can be used once the audio is segmented
2. Predicts the prob of a cough within the sample Problems faced that the component aims to fix:
1. After segmentation, there are parasitic samples that are just noise
2. After segmentation, some samples that are not cough sounds made it through
3. Non cough samples mess up final model predictions How this component is a solution:
1. This model works on smaller samples, while panns does not:
2. This model is able to help improve the data quality after the segmentation has been complete by removing bad or parasitc samples

FIG. 12A-2

General purpose and background for the component:

1. The Formant extraction is done using mathematical methods detailed in the blue link
2. The formants are extracted to be analyzed
3. The analysis of formants may help determine the healthiness of a cough sample Problems faced that the component aims to fix:

1. Classification of an unhealthy vs healthy cough sample
2. The need for a second method other than a CNN How this component is a solution:

1. This component (might) determine covid vs nocovid based off the analysis of the formant tracks extracted
2. This component will add to the accuracy of the entire system by providing a second analysis of a cough sample

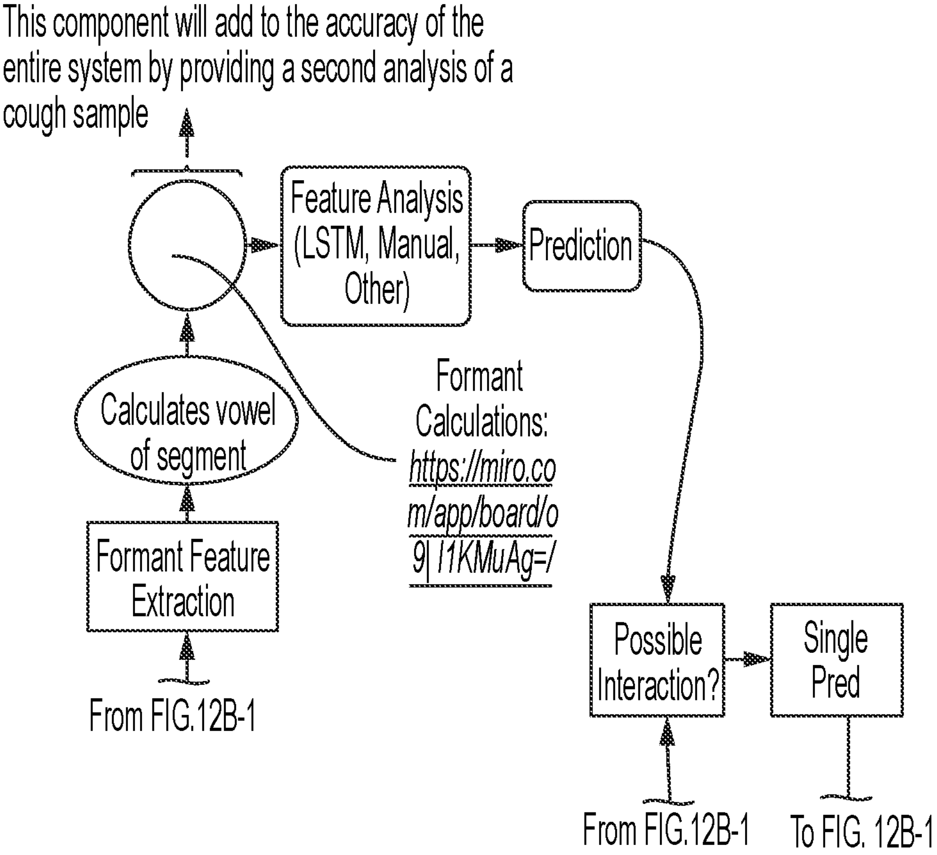

FIG. 12B

General purpose and background for the component:

1. 2D-CNN's have been used to analyze image data for quite some time
2. The model attempts to classify provided data into two separate classes, by finding unique aspects of each class
3. CNN's goal is to provide prediction on the segment helping determine if the sample is healthy or not Problems faced that the component aims to fix:

1. Determining if which class a sample belongs to

How this component is a solution:

1. With high accuracy a model is able to provide an answer to if a segment is part of class A or B

FIG. 12C-1

SYSTEMS AND METHODS FOR ACOUSTIC FEATURE EXTRACTION AND DUAL SPLITTER MODEL

CROSS-REFERENCE TO RELATED APPLICATIONS

This application claims priority to U.S. Provisional Application No. 63/340,550 filed on 11 May 2022 and entitled "SYSTEMS AND METHODS FOR ACOUSTIC FEATURE EXTRACTION AND MACHINE LEARNING CLASSIFICATION OF ACOUSTIC FEATURES," and is herein incorporated by reference in its entirety.

TECHNICAL FIELD

The present invention relates generally to Artificial Intelligence and specifically to audio segmentation and feature extraction for signal data signature classification. In particular, the present invention is directed to signal data signature segmentation, formant feature extraction, neural networks analysis of features, and signal data signature classification. In particular, it relates to generalizable feature extraction from signal data signature segments in order to allow for classification of the signal data signatures.

BACKGROUND

One general problem in the AI/ML field is the sorting of data into separate and distinct classes. The data must contain distinct information in order to allow for classification in a reproducible way.

SUMMARY OF DISCLOSURE

Signal Data Signature detection/segmentation, characterization, and classification is the task of recognizing a source signal data signature and its respective temporal parameters within a source signal data stream or recording. A Signal Data Signature consists of a sample recording of a continuous acoustic signal from a forced cough vocalization. Signal Data Signature classification has different commercial applications such as unobtrusive monitoring and diagnosing in health care and medical diagnostics.

One main method of classification of the Signal Data Signature is through the use of a convolutional neural network (CNN). A two dimensional convolutional neural network begins with the convolution of an image map. The image map is used to create an array for the input and is designed to receive two inputs. This array of the input is then multiplied by a filter (a two-dimensional array of various weights). This filter is smaller than the image size and looks at one section of the image to learn the relations. Once the relations from the first section are learned, the filter is moved over to the next section of the image to repeat the process. This is repeated until every section of the image has been examined. Once the neural network has learned the relations from the different sections of the image map, the proper weights are applied to allow for the final prediction based on the found probabilities.

Another main method of classification of the Signal Data Signature is through the use of a recurrent neural network (RNN). Unlike the CNN which looks at a single segmentation of the Signal Data Signature, the RNN looks at all the Signal Data Signature segments sequentially. A two dimensional recurrent neural network begins with the convolution of an image map. As each Signal Data Signature segment is input, the image map is used to create an array for the input and is designed to receive two inputs. This array of the input is then multiplied by a filter (a two-dimensional array of various weights). This filter is smaller than the image size and looks at one section of the image to learn the relations. Once the relations from the first section are learned, the filter is moved over to the next section of the image to repeat the process. This is repeated until every section of each image has been examined. The RNN then repeats this process by using the filter looks at one section of the first image to learn the relations. Once the relations from the first section of the first image are learned, the filter is moved over to the first section of the next image to repeat the process. This is repeated until every section of the first and second images has been examined comparing and contrasting the two images against each other. This two image cross comparison is repeated until each Signal Data Signature segment in=mage is compared section by section to all the Signal Data Signature segments from a given Signal Data Signature sequent input. Once the neural network has learned the relations from the different sections of the image map, the proper weights are applied to allow for the final prediction based on the found probabilities.

A portion of the CNN and RNN models are trained and tested with image representations of the Mel-Frequency Cepstral Components (MFCCs). However, MFCC trained models often perform unfavorably compared to the other image representations used (Melspectrograms and Fast Fourier Transformations) due to image resizing to a standard of 224×224 pixels. This is problem is addressed by using a spectrogram transformation to resize the image to 224×224 pixels. The problem is further addressed using the coefficients themselves as features, rather than converting to images. This conserves as much information as possible, and allows new ML/DL architectures to be used. Coefficients will be extracted in windows, allowing time series analysis to be performed. The use of Long Short Term Memory (LSTM) networks to learn distinctions between MFCC values across a variety of conditions in health and illness further advances the potential for the trained model.

When attempting to classify whether a sample belongs to a certain class or not, having multiple classification models greatly increases performance. Within the forced cough vocalization (FCV), there are segments called a vowel. A vowel is a part of the speech signal considered to be voiced. When a person is physically creating vibrations from their throat, a pitch is formed. This vowel component typically has an onset and offset as there are consonant sounds between the voiced vowel intervals. These voiced vowel intervals contain information which is distinctive and allows for further analysis of the forced cough vocalization. The Formant Feature Extraction aims to extract the formant tracks and the features from the voiced vowel intervals of a submitted SDS sample. This extraction allows for further analysis of a sample and more accurate classification.

A large problem faced by the CNN and the Formant Feature Extraction is the standardization of data as an input into the models. Many publicly available FCV-SDS databases and registries have varied levels of recording quality at times and hold Moderate to Poor quality FCV-SDS data. Models trained with moderate quality data are capable of identifying illness from FCV-SDS recordings from the same or similar database but are unable to generalize to FCV-SDS recordings from diverse databases or subjects from the general population.

Software to record a training data set and use the training data set to train the models, validate the training and threshold/weight the models/oracle design of the training code for the CNN and Formant Feature Extraction are based on the normalization of the input data. As an example, the models may incorrectly perform a classification if one sample presented contained five coughs, while another sample contained 10 coughs.

An additional problem faced by the CNN and the Formant Feature Extraction is the presence of background noise within the submitted sample. The background noise could add additional relations in the training samples utilized to train the model. Overfitting the model to the training data with added relations from the background noise may prevent the model from accurately classifying unseen real life data. In the Formant Feature Extraction, background noise may add extra features to the sample which could skew the final predictions.

In some embodiments, burst detection is based on the calculation of the energy levels within a frame of the audio data. These calculations are compared to threshold to determine the onset of a burst. The burst may be defined as a high level of energy over a wide frequency spectrum that spans between 1 and 3 frames of the audio sample. This burst, when related to an FCV-SDS, corresponds to the opening of the glottis at the beginning of the FCV. The Burst Splitter Method, such as, a dual Hidden Markov Model splitter method, may be a form of splitting to achieve the data cleaning that enables systems and methods to overcome the above technical problems. This methodology splits the incoming Signal Data Signatures into individual cough segments to allow for the CNN and the Formant Feature Extraction to analyze individual cough segments. This allows for direct comparison between samples as there is a normalized number of coughs within the segment. Additionally, the splitting method may enable the removal of non-cough portions of sounds within the sample. The removal of background noise allows for higher model accuracy.

In some embodiments, the splitting of the cough samples into individual cough segments may be customized to address cough segments having a double peak. Typically, a forced cough vocalization contains one peak due to the initial burst of energy at the onset of a cough. Alternatively, some samples have shown a double peak in energy at the beginning of the cough sample. This double peak is characterized as two distinct energy peaks within several dozen milliseconds (typically under 100 milliseconds) of each other. A software tool (e.g., python script, Javascript script, or other programming language or combination thereof) may be created to analyze a directory full of the cough samples for the appearance of the double peak within the file. Such a software tool may return a true or false value and provides an additional usable feature of the audio which helps determine the presence of the respiratory illness within the audio sample. Dual peak structure of cough is also a feature for splitting.

In some embodiments, a Hidden Markov Model (HMM) may create a probabilistic model to determine the likelihood a sound is a cough based on the probability that the audio sample belongs to the calculated distribution. HMMs are traditionally used to generate information. However, in some embodiments of the present disclosure, one or more HMMs may be reconfigured to create predicted values on audio event samples. In some embodiments, the method to train the HMM may be unique as it utilizes the hand labeling of audio files that specify the events to trigger a split within the audio sample. A Dual-Layer HMM Segmenter addresses the problems of single layer HMM segmenters. A Single Layer HCCs may not split rapid sequences of coughs correctly. Due to the single layer HMI's window sizing being generalized to split large FCV signals, the single layer HMM may not transition states during rapid cough sequences. As a result, a system and/or method may when using a single layer HMM not always eliminate noisy segments either attached to the cough segment, or on their own. Due to generalized window sizing of the single layer HMM, noise can sometimes split through.

In some embodiments, a dual layer HMM system may solve the above technical difficulties. After the first layer HMM has run, the first layer HMM may transfer an initial segmented signal output to a second layer HMM. The second layer HMM may fix the problems stated above, due to its window sizes being set for finer cuts relative to the first layer. If the first layer HMM did not split a rapid cough sequence correctly, the second layer HMM can process the sequence with greater precision. The second layer HMM may also help to eliminate noise due to it being more precise.

In some embodiments, an additional feature may include Formant Slurring and Dual Peak Analysis. Physiologically, the first two formants (F1 and F2) are both a resonance of the fundamental frequency (F0). The two formants F1 and F2 may resonate at different frequencies with F1 being the first resonance of F0, and F2 being the second resonance. Accordingly, Formant analysis can facilitate determining Fz alterations in a vocalization-related muscle by determining and analyzing a level of clarity in the Formants. For example, there may be one class that has a non-continuous ("broken") F1 while another class has a continuous F1 this could be used in a mathematical model to determine the quality of operation of the vocalization-related muscle and form a distinction between the classes, such as, e.g., the diagnosis of a condition and/or severity of a condition. However, there may be a convergence or mixing of the two formants. The convergence may be indicative of a physiological force that is disrupting or altering the usual resonance. In some embodiments, the physiological impact is possibly indicative of the presence of an acute or chronic illnesses. Analyzing forced cough vocalization signal data signatures may demonstrate two peaks in the energy. Thus, the feature analysis may identify two peaks within the signal data signature and return the time stamp where this audio event of interest occurs.

Embodiments of the present disclosure may include a signal data signature classification method which includes a splitting method for the signal data signature sample, burst detection and dual peak detection, MFCC determination, a formant feature extraction method, and/or neural network-based feature extraction methods. In some embodiments, the signal data signature classification system components include input data, computer hardware, computer software, and output data that can be viewed by a hardware display media or paper. A hardware display media may include a hardware display screen on a device (computer, tablet, mobile phone), projector, and other types of display media.

BRIEF DESCRIPTION OF THE DRAWINGS

FIG. 12A, FIG. 12A-1, FIG. 12A-2, FIG. 12B, FIG. 12B-1, FIG. 12C and FIG. 12C-1 illustrates a broad schematic for the entire process of SDS audio sample to a final prediction in accordance with aspects of embodiments of the present disclosure.

DETAILED DESCRIPTION

Figure 1:
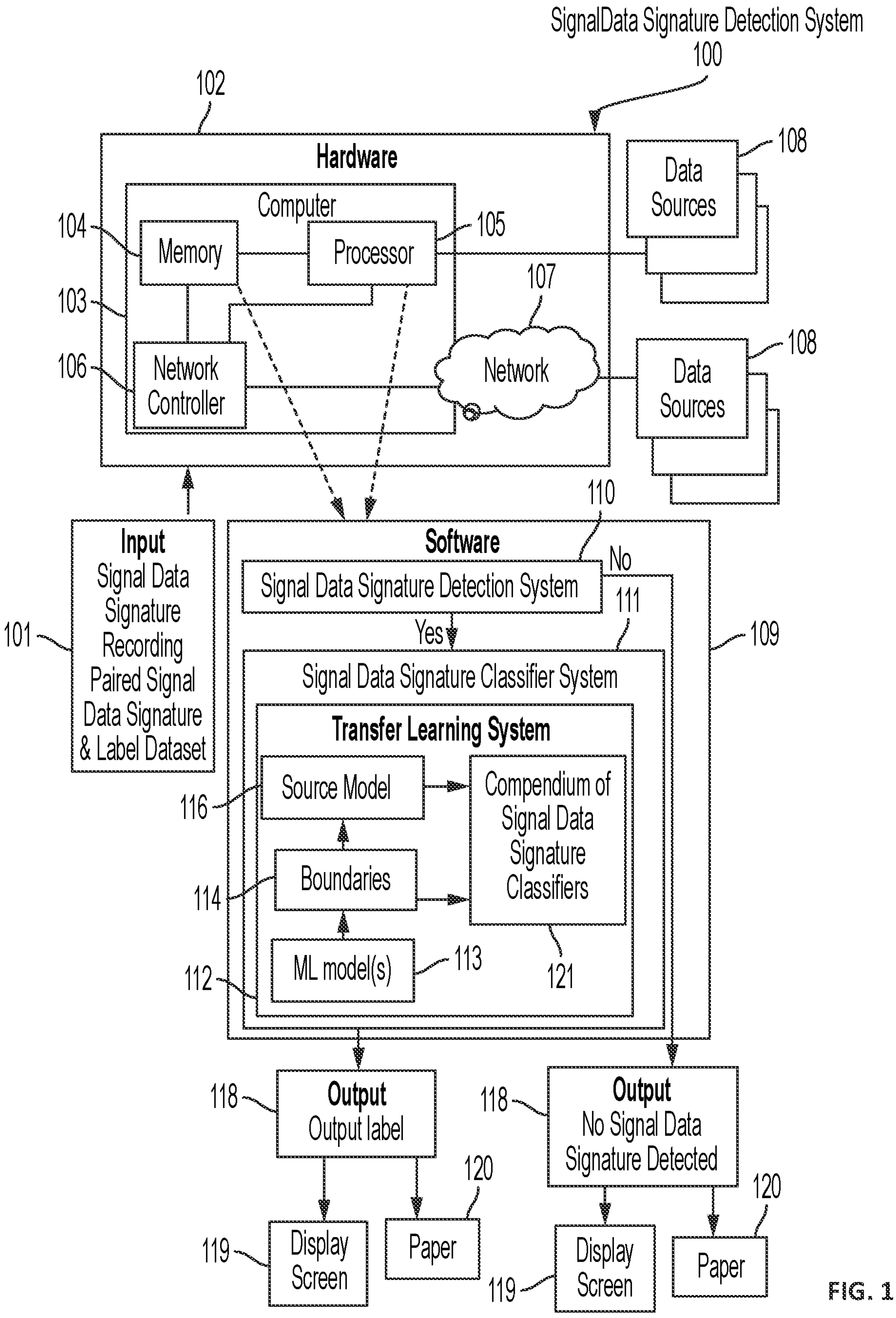
FIG. 1 illustrates a signal data signature detection system in accordance with aspects of embodiments of the present disclosure.

FIG. 1A illustrates a signal data signature detection system 100 with the following components: input 101, hardware 102, software 109, and output 118. The input may be a signal data signature recording such as a signal data signature recording captured by a sensor, a signal data signature recording captured on a mobile device, and a signal data signature recording captured on any other device, among others. The input 101 may be provided by an individual, individuals or a system and recorded by a hardware device 102 such as a computer 103 with a memory 104, processor 105 and or network controller 106. A hardware device is able to access data sources 108 via internal storage or through the network controller 106, which connects to a network 107.

In some embodiments, the signal data signature detection system 100 may identify a classification label that indicates the presence or absence of a disease when the system is provided with unbalanced paired signal data signature recordings and their corresponding disease labels and another unlabeled signal data signature recording. These embodiments are advantageous for identifying classification labels such as, e.g., underlying respiratory illnesses for providing in-home, easy to use diagnostics for respiratory conditions, such as, e.g., COVID-19, bronchitis, pneumonia, chronic obstructive pulmonary disorder (COPD), emphysema among others or any combination thereof.

In some embodiments, in order to achieve a software program that is able, either fully or partially, to detect and diagnose signal data signatures, that program generates a compendium of signal data signature classifiers 121 from a training dataset. Another challenge is that such a program must be able to scale and process large datasets.

Embodiments of the present disclosure are directed to the signal data signature detection system 100 whereby a signal data recording (the input 101) is provided by an individual or individuals(s) or system into a computer hardware whereby labeled data sources and unlabeled data source(s) are stored on a storage medium and then the labeled data sources and unlabeled data source(s) are used as input to a computer program or computer programs which when executed by a processor(s) provides compendium of signal data signature classifiers 121 saved to a hardware device as executable source code such that when executed by a processor(s) with an unlabeled data source(s) generates an output label(s) (the output 118) which is shown on a hardware device such as a display screen or sent to a hardware device such as a printer where it manifests as physical printed paper that indicates the diagnosis of the input signal data recording and signal data signature.

In some embodiments, the data sources 108 that are retrieved by a hardware device 102 in one of other possible embodiments includes for example but not limited to: 1) imbalanced paired training dataset of signal data signature recordings and labels and unlabeled signal data signature recording, 2) balanced paired training dataset of signal data signature recordings and labels and unlabeled signal data signature recording, 3) imbalanced paired training dataset of video recordings and labels and unlabeled video recording, 4) imbalanced paired training dataset of video recordings and labels and unlabeled signal data signature recording, 5) paired training dataset of signal data signature recordings and labels and unlabeled video recording. In some embodiments, a "balanced" training dataset may include an equal number of training signal data signature records for each classification, such as equal numbers of training data for each of a first classification and for a second classification in a binary classification, such as, e.g., a positive and a negative classification in a diagnosis classification. In some embodiments, an "imbalanced" training dataset may include an unequal number of training signal data signature records for a first classification and for a second classification in a binary classification, such as, e.g., a positive and a negative classification in a diagnosis classification. Example ratios for an imbalanced training dataset may include, e.g., 70:30, 50:25:25, 60:40, 60:20:20, or any other suitable ratio. Such a training scheme influences the training, machine learning and probability predictions of the classifiers trained with the balanced and/or unbalanced SDS data sets. Unbalanced sets tend to bias the ML towards the higher ratio SDS as a prediction where balanced sets tend to bias towards more equal probabilities.

In some embodiments, the data sources 108 and the signal data signature recording input 101 are stored in memory or a memory unit 104 and passed to a software 109 such as computer program or computer programs that executes the instruction set on a processor 105. The software 109 being a computer program executes a signal data signature detector system 110 and a signal data signature classification system 111. The signal data signature classification system 111 executes a signal data signature classifier system 112 on a processor 105 such that the paired training dataset is used to train machine learning (ML) models 113 that generate boundaries within the dataset 114 whereby the boundaries inform the scope and datasets of target model(s) 121 and the source model 116, such that knowledge is transferred 117 from the source model 116 to the target model(s) 121.

In some embodiments, the boundaries may include thresholds set for determination of a diagnosis based on the classifier predictions. For example, if the predictions from the classifier span 0.001 (negative_diagnosis) to 0.999 (positive_diagnosis) then thresholds (boundaries) are used to determine the lower limit for positive_diagnosis prediction values, such as, e.g., 0.689 (or any other positive diagnosis boundary such as any value in a suitable including, e.g., between 0.500 and 0.599, between 0.600 and 0.699, between 0.700 and 0.799, between 0.800 and 0.899, between 0.900 and 0.999, etc.) above which the diagnosis is detected and diagnosed. While a negative_diagnosis prediction value threshold (boundary), such as, e.g., 0.355 (or any other negative_diagnosis boundary such as any value in a suitable including, e.g., between 0.000 and 0.099, between 0.100 and 0.199, between 0.200 and 0.299, between 0.300 and 0.399, between 0.400 and 0.499, etc.) defines the limit below which the diagnosis is no disease detected. Between the boundaries (0.3551 to 0.6889) is indeterminant. In some embodiments, the thresholds may be learned via the training of the ML models 113, experimentally determined, or determined by any other suitable technique. The positive diagnosis boundary may include, e.g., between 0.400 and 0.499, between 0.500 and 0.599, between 0.600 and 0.699, between 0.700 and 0.799, between 0.800 and 0.899, between 0.900 and 0.999, for example 0.680, 0.681, 0.682, 0.683, 0.684, 0.685, 0.686, 0.687, 0.688, 0.689, 0.690, 0.691, 0.692, 0.693, 0.694, 0.695, 0.696, 0.697, 0.698, 0.699, 0.700, etc. The negative diagnosis boundary may include, e.g., between 0.100 and 0.199, between 0.200 and 0.299, between 0.300 and 0.399, between 0.400 and 0.499, for example 0.350, 0.351, 0.352, 0.353, 0.354, 0.355, 0.356, 0.357, 0.358, 0.359, 0.360, 0.361, 0.362, 0.363, 0.364, 0.365, 0.366, 0.367, 0.368, 0.369, 0.370, etc. The signal data signature classifier system 112 defines the boundaries and scope of target model(s) 121 and source model 116 whereby knowledge is transferred 117 from the source model 116 that has been trained on a larger training dataset to the target model (s) 121 that are trained on a smaller training dataset. In some embodiments, the output 118 is a label that indicates the presence or absences of a condition given that an unlabeled signal data signature recording is provided as input 101 to the signal data signature detection system such that the output 118 can be viewed by a reader on a display screen 119 or printed on paper 120.

In some embodiments, the signal data signature detection system 100 hardware 102 includes the computer 103 connected to the network 107. The computer 103 is configured with one or more processors 105, a memory or memory unit 104, and one or more network controllers 106. In some embodiments, the components of the computer 103 are configured and connected in such a way as to be operational so that an operating system and application programs may reside in a memory or memory unit 104 and may be executed by the processor or processors 105 and data may be transmitted or received via the network controller 106 according to instructions executed by the processor or processor(s) 105. In some embodiments, a data source 108 may be connected directly to the computer 103 and accessible to the processor 105, for example in the case of a signal data signature sensor, imaging sensor, or the like. In some embodiments, a data source 108 may be executed by the processor or processor(s) 105 and data may be transmitted or received via the network controller 106 according to instructions executed by the processor or processors 105. In one embodiment, a data source 108 may be connected to the signal data signature classifier system 112 remotely via the network 107, for example in the case of media data obtained from the Internet. The configuration of the computer 103 may be that the one or more processors 105, memory 104, or network controllers 106 may physically reside on multiple physical components within the computer 103 or may be integrated into fewer physical components within the computer 103, without departing from the scope of the present disclosure. In one embodiment, a plurality of computers 103 may be configured to execute some or all of the steps listed herein, such that the cumulative steps executed by the plurality of computers are in accordance with the present disclosure.

In some embodiments, a physical interface is provided for embodiments described in this specification and includes computer hardware and display hardware (e.g., the display screen of a mobile device). In some embodiments, the components described herein may include computer hardware and/or executable software which is stored on a computer-readable medium for execution on appropriate computing hardware. The terms "computer-readable medium" or "machine readable medium" should be taken to include a single medium or multiple media that store one or more sets of instructions. The terms "computer-readable medium" or "machine readable medium" shall also be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. In other embodiments, some of these operations might be performed by specific hardware components that contain hardwired logic. Those operations might alternatively be performed by any combination of programmable computer components and fixed hardware circuit components.

In one or more embodiments of the signal data signature classifier system 111 software 109 includes the signal data signature classifier system 112 which will be described in detail in the following section.

In one or more embodiments of the signal data signature detection system 100 the output 118 includes a strongly labeled signal data signature recording and identification of signal data signature type. An example would be signal data signature sample from a patient which would include: 1) a label of the identified signal data signature type, 2) or flag that tells the user that a signal data signature was not detected. The output 118 of signal data signature type or message that a signal data signature was not detected will be delivered to an end user via a display medium such as but not limited to a display screen 119 (e.g., tablet, mobile phone, computer screen) and/or paper 120.

In some embodiments, the label produced by the signal data signature classifier system 111 may include a start time, an end time or both of a segment an audio recording of the input 101. In some embodiments, the signal data signature classifier system 111 may be trained to identify a modified audio recording in the signal data signature recording 101 based on a matching to a target distribution. In some embodiments, the modified signal data signature recording may include a processing that extracts segments of the audio recording. For example, the signal data signature classifier system 111 may identify, e.g., individual coughs in a recording of multiple coughs, and extract a segment for each cough having a start time label at a beginning of each cough and an end time label at an end of each cough. In some embodiments, the audio recording may be a single cough, and the signal data signature classifier system 111 may label the start time and the end time of the single cough to extract the segment of the audio recording having the cough.

Figure 2:
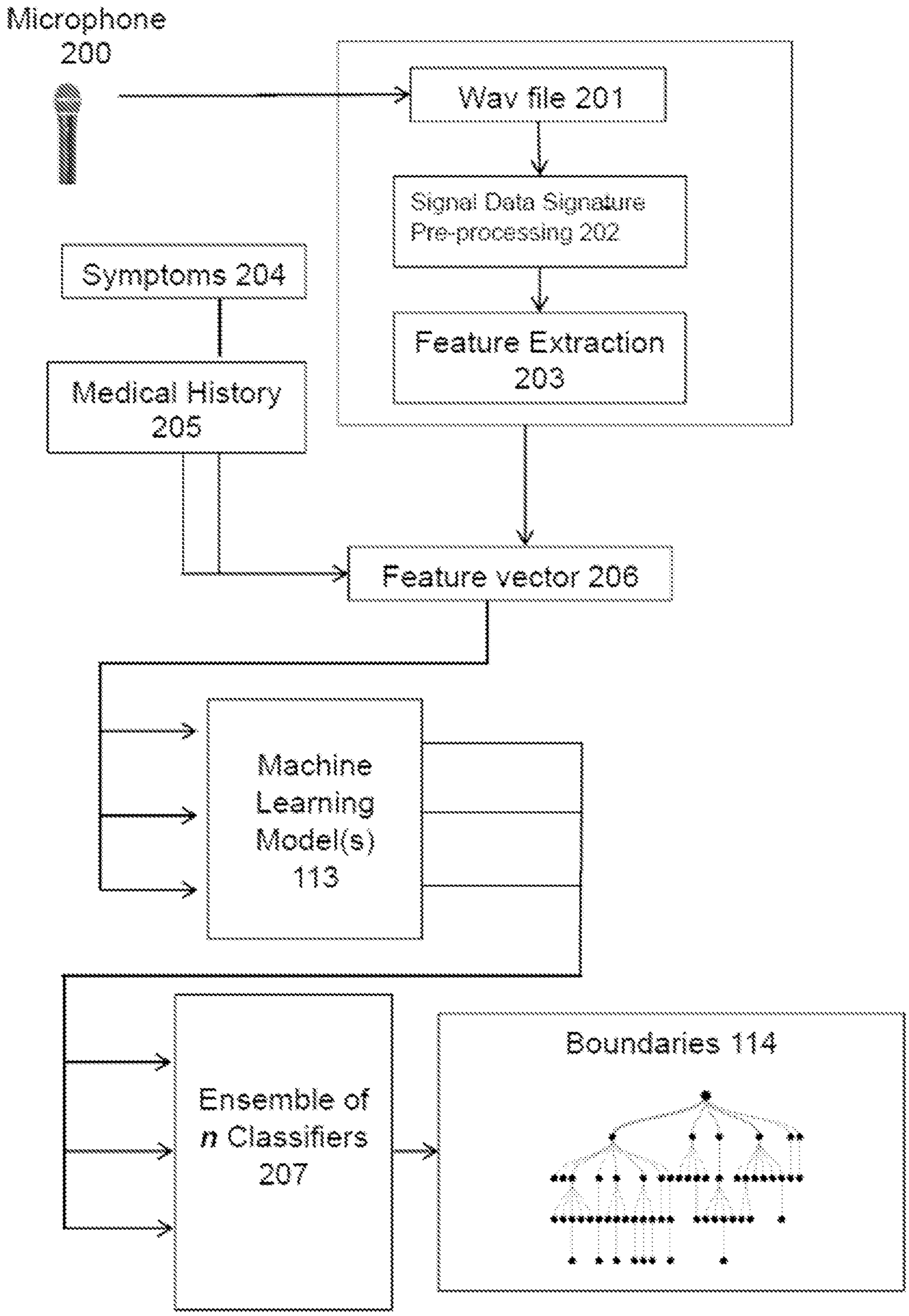
FIG. 2 illustrates a machine learning derived boundaries in accordance with aspects of embodiments of the present disclosure.

In some embodiments, a signal data signature classifier system 112 with real-time training of machine learning models 113 and the real-time training of model(s) 121 and the source model 116, hardware 102, software 109, and output 118. FIG. 2. illustrates an input to the signal data signature classifier system 112 that may include but is not limited to paired training dataset of signal data signature recordings and corresponding signal data signature labels and an unpaired signal data signature recording 101 that is first received and processed as a signal data signature wave by a hardware device such as a microphone 200. In addition, the signal data signature labels may be input into the signal data signature classifier system using a physical hardware device such as a keyboard.

In some embodiments, the signal data signature classifier system 112 uses a hardware 102, which includes of a memory or memory unit 104, and processor 105 such that software 109, a computer program or computer programs is executed on a processor 105 and trains in real-time a set of signal data signature classifiers. The output from signal data signature classifier system 112 is a label 118 that matches and diagnosis a signal data signature recording file. A user is able to the signal data signature type output 118 on a display screen 119 or printed paper 120.

In some embodiments, the signal data signature classifier system 112 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, training the set of signal data signature classifiers may include transfer learning to share model features amongst the signal data signature classifiers in the set of signal data signature classifiers. In some embodiments, the model features may include, e.g., Fast Fourier Transform spectrogram, MEL spectrogram, MFCC Spectrogram, as well as specific spectrum features such as formant configuration or formant slurring, among other features or any combination thereof.

For example, in one embodiment, the input 101 including an audio recording of a forced cough vocalization is sent through an application of a user's mobile device ("mobile app") to a database (e.g., data sources 108 and/or memory 104), e.g., via an application programming interface (API). The forced cough vocalization may be approximately a few seconds in length, e.g., less than 15 seconds, less than 14 seconds, less than 13 seconds, less than 12 seconds, less than 11 seconds, less than 10 seconds, less than 9 seconds, less than 8 seconds, less than 7 seconds, less than 6 seconds, less than 5 seconds, less than 4 seconds, less than 3 seconds, less than 2 seconds, or other suitable length to capture a forced cough vocalization.

In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the mobile app may produce a request via the API which uploads the sound to the database and lets the database know that the API is requesting a prediction on that data. The database may then send the unclean forced cough audio from the client to first be split through a burst detection method (further detailed below in reference to FIG. 4). In some embodiments, the burst detection method identifies bursts in energy and activity in the audio recording of the forced cough vocalization and believes that these are forced cough vocalizations and iterates through each sample given by the audio to return an estimated end time of the cough. When the algorithm has found all potential forced cough vocalizations, the algorithm extracts or segments the original audio recording to create discrete forced cough vocalizations to help reduce noise and shorten the sequence.

In some embodiments, the segments may be sent to the database for the Formant Feature Extraction process to consume, and in turn extracts the F0-F3 features and further computed features (such as how "mixed" the values are or values that are within some certain threshold of each other) from these values and uploads them to the database along with the client's query for later computation and analysis. In some embodiments, the Formant Feature Extraction may utilize one or more feature extraction machine learning models, such as, e.g., one or more convolutional neural networks, recurrent neural networks, decision trees, random forests, support vector machines (SVMs), autoencoders, among others or any combination thereof.

In some embodiments, Formant analysis may facilitate determination of Fz alterations in a vocalization-related muscle by looking at the level of clarity in the Formants. For example, there may be one class that has a non-continuous ("broken") F1 while another class has a continuous F1 this could be used in a mathematical model to determine the quality of operation of the vocalization-related muscle and form a distinction between the classes, such as, e.g., the diagnosis of a condition and/or severity of a condition.

In some embodiments, each model may access the images generated by the burst detection method (which may include grayscale images of FFT data from the segments of the original file) and return the output values to the database, recording these values which are mapped to the original requests. In some embodiments, the returned values may include a probability of the file matching the reference library. Those CNN output values may be fed into an oracle machine learning model. In some embodiments, the oracle machine learning model may be trained to ingest the probability values and apply learned parameters and/or hyperparameters to weight the decisions of each CNN in order to determine the importance of each model's prediction individually. Using the decisions and weights of each CNN, the oracle may create a final discrete output which signifies whether the forced cough vocalization is determined to be a match to the reference library. In some embodiments, the final discrete output may be recorded in the database to update historical records. In some embodiments, the oracle machine learning model may utilize one or more machine learning models, such as, e.g., one or more convolutional neural networks, recurrent neural networks, logistic regression models, decision trees, random forests, support vector machines (SVMs), autoencoders, among others or any combination/ensemble thereof.

FIG. 2 depicts a partial view of the signal data signature classifier system 112 with an input signal data signature recording 101 captured using a physical hardware device, microphone 200; such that the signal data signature signal is captured as a .wav file 201, or any other type of computer readable signal data signature signal formatted file, and is then pre-processed 202. Signal Data Signature Pre-Processing 202 imposes a few, basic standards upon the sample. This filter acts to address quality-centric concerns, including, e.g., Stereo to Mono Compatibility, Peak Input Loudness Level, and Attenuation of Unrelated Low Frequencies.

In some embodiments, pre-processing 202 may include Stereo to Mono Compatibility which may include combining two channels of stereo information into one single mono representation. The stereo-to-mono filter may ensure that only a single perspective of the signal is being considered or analyzed at one time.

In some embodiments, pre-processing 202 may include normalizing the mono signal and increasing the amplitude to a loudest possible peak level while preserving all other spectral characteristics of the source; including frequency content, dynamic range as well as the signal to noise ratio of the sound.

In some embodiments, pre-processing 202 may include removing any unwanted low frequency noises such as background fan noise, machinery or traffic that could obscure the analysis of the target sound of the source file. This is achieved by implementing a High Pass Filter, with a Cutoff of 80 hz at a slope of −36 dB/8 va (Oct).

In some embodiments, once signal data signature preprocessing is complete, feature extraction algorithms operate on the pre-processed signal data signature file to perform feature extraction 203. In some embodiments, extracted features resulting from the feature extraction 203, along with or without symptoms 204 and/or medical history 205, may be encoded into a feature vector 206. In some embodiments, the feature extraction 203 may include processes including, e.g., audio splitting (e.g., using single and/or dual layer HMM), dual peak detection, burst detection, Formant feature extraction, MFCC extraction, Fourier transform processes, among other machine learning-based and/or algorithmic feature detection, extraction and/or generation techniques for processing an audio file to create the feature vector 206 or any combination thereof.

In some embodiments, the feature vector 206 may be used as an input to train machine-learning model(s) 113 which result in an ensemble of n classifiers 207. The ensemble of n classifiers is used to define the natural boundaries 114 in the training dataset.

Figure 3:
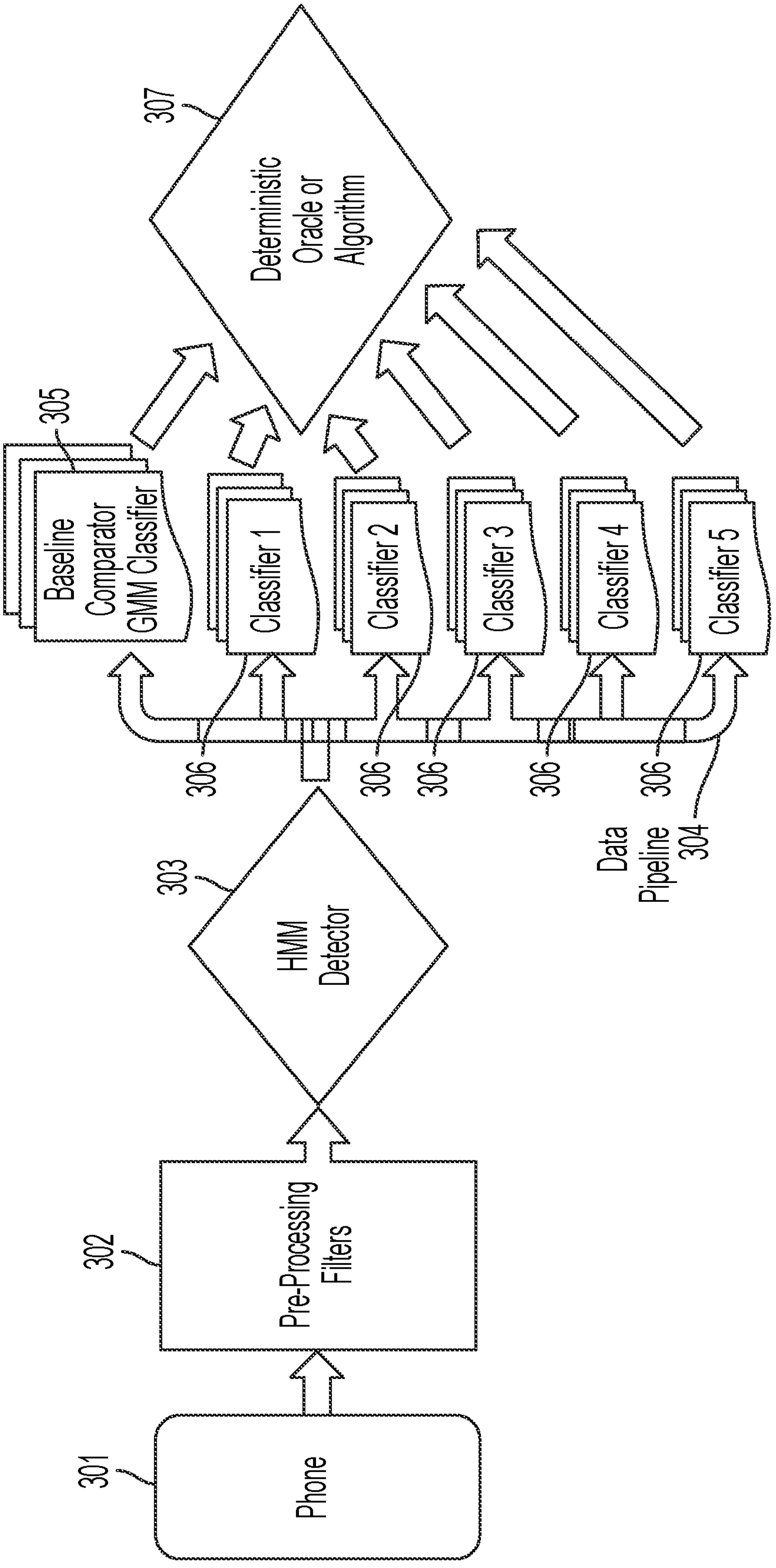
FIG. 3 illustrates a signal data signature classifier system including an ensemble of classifiers in parallel in accordance with aspects of embodiments of the present disclosure.

FIG. 3 depicts an illustrative signal data signature classifier system in accordance with aspects of embodiments of the present disclosure. In some embodiments, referring to FIG. 3, the signal data signature may be captured by a mobile phone or other mobile device using an app or a web client (301). The signal data signature passes through a pre-processing filter as describer for (202) above and for (302) in this figure. The signal data signature is filtered using a Hidden Markov Model (HMM) help direct signal data signatures (303) to the correct classifiers. The data then flows through a parallel data pipeline (304). The signal data signature is passed to a comparison classifier (305) for the purpose of determining whether or not the submitted signal data signature matches the baseline cluster of signal data signatures for the user. Concurrently, the data is passed to multiple identical classifiers (306), e.g., neural network classifiers such as, e.g., artificial neural network (using long short-term memory (LSTM), gated recovery units, or other activation functions or any combination thereof), convolutional neural network, recurrent neural network, etc., existing as instances in identical environments trained with randomly selected signal data signatures from a large pool of calibration quality signal data signatures classify the incoming signal data signature. The relative probability of a signal data signature matching a signal data signature library in each classifier is passed to a deterministic oracle/algorithm (307) may provide a diagnosis.

Figure 4:
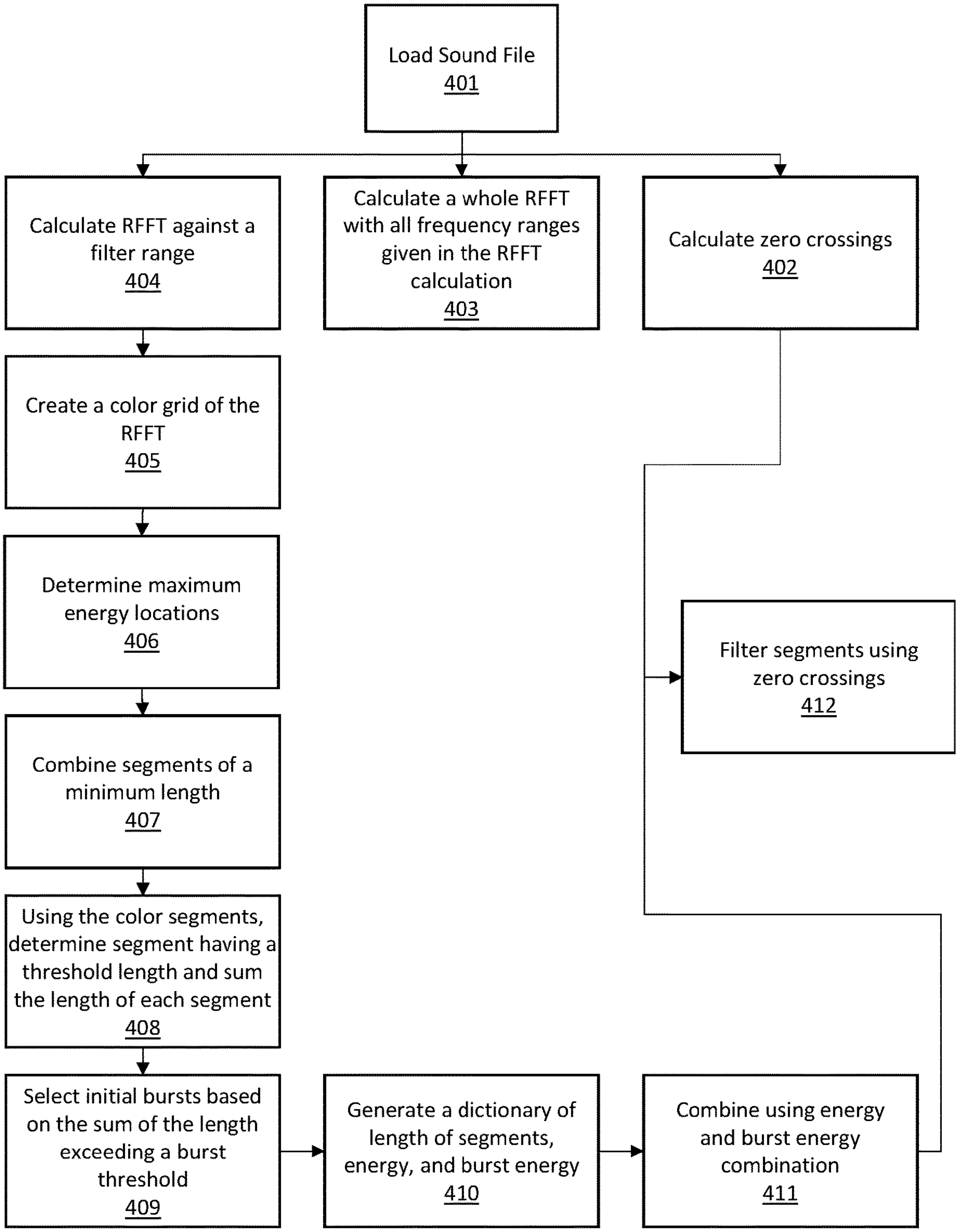
FIG. 4 illustrates a flowchart for burst detection and each component of the process in accordance with aspects of embodiments of the present disclosure.

FIG. 4 illustrates a flowchart for burst detection and each component of the process in accordance with aspects of embodiments of the present disclosure.

In some embodiments, feature extraction (e.g., feature extraction 203) may include burst detection to help detect when an event has occurred and to be used as an audio segmentation method. This allows for the segmentation of the audio files.

At step 401, one or more feature extraction components may ingest an unprocessed audio file. In some embodiments, the audio file may include any suitable format and/or sample rate and/or bit depth. For example, the sample rate may include, e.g., 8 kilohertz (kHz), 11 kHz, 16 kHz, 22 kHz, 44.1 kHz, 48 kHz, 88.2 kHz, 96 kHz, 176.4 kHz, 192 kHz, 352.8 kHz, 384 khz, or other suitable sample rate. For example, the bit depth may include, e.g., 16 bits, 24 bits, 32 bits, or other suitable bit depth. For example, the format of the audio file may include, e.g., stereo or mono audio, and/or e.g., waveform audio fie format (WAV), MP3, Windows media audio (WMA), MIDI, Ogg, pulse code modulation (PCM), audio file format (AIFF), advanced audio coding (AAC), free lossless audio codec (FLAC), Apple lossless audio codec (ALAC), or other suitable file format or any combination thereof. In some embodiments, an example embodiment that balances detail with memory and resource efficiency and availability and compatibility with commonly available equipment, the audio file may include a 48 kHz mono WAV file.

In some embodiments, upon ingestion, the audio file may be separated into sections of suitable length for analyzing each portion of the audio file as individual components, such as, e.g., 10 milliseconds or any other suitable length (e.g., 1 ms, 2 ms, 3 ms, 4 ms, 5 ms, 6 ms, 7 ms, 8 ms, 9 ms, 10 ms, 11 ms, 12 ms, 13 ms, 14 ms, 15 ms, 16 ms, 17 ms, 18 ms, 19 ms, 20 ms or greater). This process outputs the locations of detected bursts through the mathematical methods seen in the process. For this method we specifically want little to no preprocessing because we want the data to contain the low frequency noises which will help determine a burst.

At step 402, zero crossings may be calculated by evaluating short frames (e.g., 20-30 ms long) and then counting the number of times the signal crosses the zero value. In some embodiments, the zero crossings may be calculated by summing the absolute differences between consecutive sign values (1 for positive, 0 for zero, −1 for negative), then dividing by 2 (because this count will be twice the number of zero crossings), and finally dividing by the frame length to get a rate.

The Zero Crossing Rate (ZCR) may be calculated through each frame, e.g., each section based on the separation of step 401.

At step 403, a whole real fast Fourier transform (RFFT) may be calculated with all frequency ranges given in the RFFT calculation, including, e.g., calculating bin size. Additionally, the full RFFT and a set of RFFT within a frequency range may be calculated.

At step 404, an RFFT may be calculated against a predetermined filter range. The predetermined filter range may include any suitable range of interest. For example, for cough analysis in disease detection, the range of interest may include, e.g., in a range of 1500 Hz to 3500 Hz, 1000 Hz to 4000 Hz, or other suitable range or any combination thereof. Within each section created at step 401, the RFFT and the frequency bin size may be calculated.

At step 405, a color grid of the RFFT may be generated. The color grid may include an image of the RFFT waveform where a color grid for the RFFT waveform of each section is generated. A first color may be utilized if the observed value calculated by the RFFT is within a threshold percentage of the maximum value, such as, e.g., within about 5%, 10%, 11%, 12%, 13%, 14%, 15%, 16%, 17%, 18%, 19%, 20%, 25%, etc. In some embodiments, the first color may include a gradient, e.g., on a gray scale or other monochromatic scale, on a polychromatic scale, in bands of values where each band is a different color, or by any other representation.

Values outside of the threshold percentage may be represented in the color grid as a second color. In some embodiments, the second color may include a gradient, e.g., on a gray scale or other monochromatic scale, on a polychromatic scale, in bands of values where each band is a different color, or by any other representation. In some embodiments, the first color and the second color are different. The grids may be used to find the bursts within the audio sample.

At step 406, maximum energy locations may be identified based on the color grids and/or the RFFT values. For example, maximum energy locations may include, e.g., RFFT values within at least 15 percent of the maximum energy found in the row of the RFFT, or within any other suitable percentage, such as, e.g., %, 10%, 11%, 12%, 13%, 14%, 15%, 16%, 17%, 18%, 19%, 20%, 25%, etc.

At step 407, segments of a minimum length may be combined to account for any discrepancies. In some embodiments, the minimum length may include At step 408, segments formed of some required number of sections may be identified using the color grids. In some embodiments, the required length may include, e.g., 1 sections, 2 sections, 3 sections, 4 sections, 5 sections, 6 sections, 8 sections, 9 sections, 10 sections or more or any other suitable length. and sum the length of each segment. For example, the grids of each section may be searched for color rows having the first color with a sum of 8 first color pixels which are at least a length of 5 pixels. In some embodiments, where a segment of sections is greater than a burst threshold (e.g., 5, 6, 7, 8, 9, 10 or more sections), then the segment may be identified as an initial burst. These rows will be considered the bursts and the burst's energy and the energy within, e.g., three to six frames will be calculated.

At step 409, initial bursts may be selected based on a sum of the length exceeding the burst threshold. After this initial calculations of the bursts, the bursts may be filtered. Bursts which are more than a predetermined number of sections apart are eliminated and then the filter looks for the greatest sum of energy and burst energy. In some embodiments, the number of sections for filtering may be in one possible example 12 sections, but may be any other suitable number such as, e.g., 5, 6, 7, 8, 9, 10, 11, 12, 13, 14, 15, 16, 17, 18, 19, 20 or any other suitable number.

At step 410, a dictionary of segments may be formed that catalogs each segment exceeding the predetermined number of sections. The dictionary may include the color grids of each segment of sections and/or attributes of each segment including, e.g., length of segments, energy, burst energy, among other attributes or any combination thereof.

At step 411, the energy and the burst energy for each segment are combined. In some embodiments, the combination may include concatenating the data of the energy and of the burst energy into a feature data structure for the segment, superimposing images of the energy and the burst energy, or otherwise linking, associating and/or combining the energy and the burst energy information for each segment.

At step 412, segments may be filtered using the zero crossings of step 402. The bursts may then be combined with the new ZCR data to find ZCR values which are greater than a threshold ZCR, e.g., 10, 15, 20, 25, 30, 35, 40, 45, 50 or more or other threshold in a range of 5 to 100, and has its last few frames within the burst window have a ZCR value below a threshold ZCR value, such as, e.g., less than 5, 10, 15, 20, 25, 30, 35, 40, 45, 50 or more or other threshold in a range of 5 to 100. In some embodiments, the bursts satisfying the threshold ZCR and/or the threshold ZCR value may be the bursts segments that are kept for further analysis. In some embodiments, the right most value is shrunk until the energy is greater than or equal to, e.g., 1, 2, 3, 4, 5, 6, 7, 8, 9, 19 percent. These bursts are then used in order to allow for audio segmentation for further analysis by the formant feature extraction and the convolutional neural network.

Figure 5A:
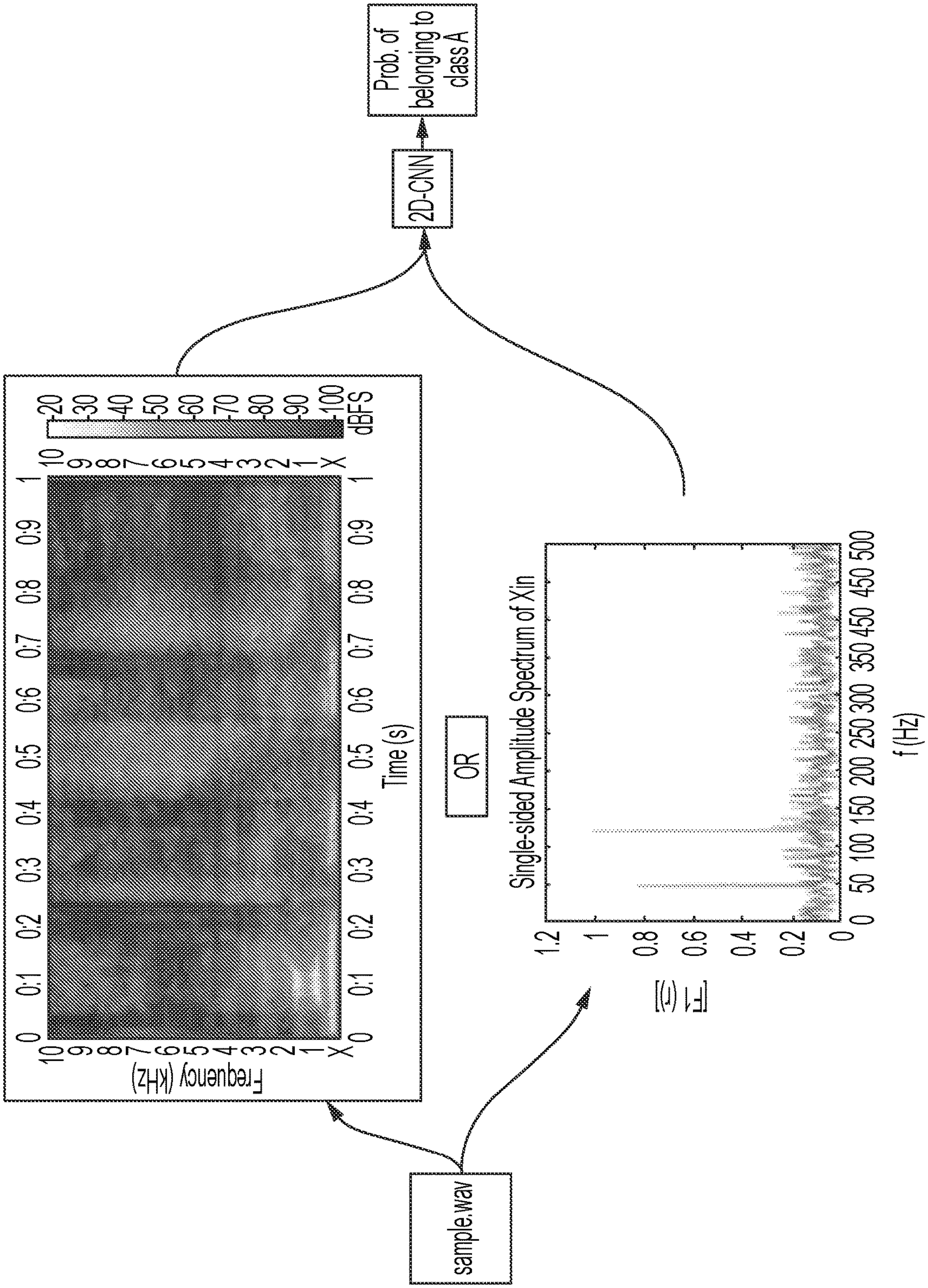
FIG. 5A illustrates the general two dimensional (2D)-CNN structure in accordance with aspects of embodiments of the present disclosure.
Figure 5B:
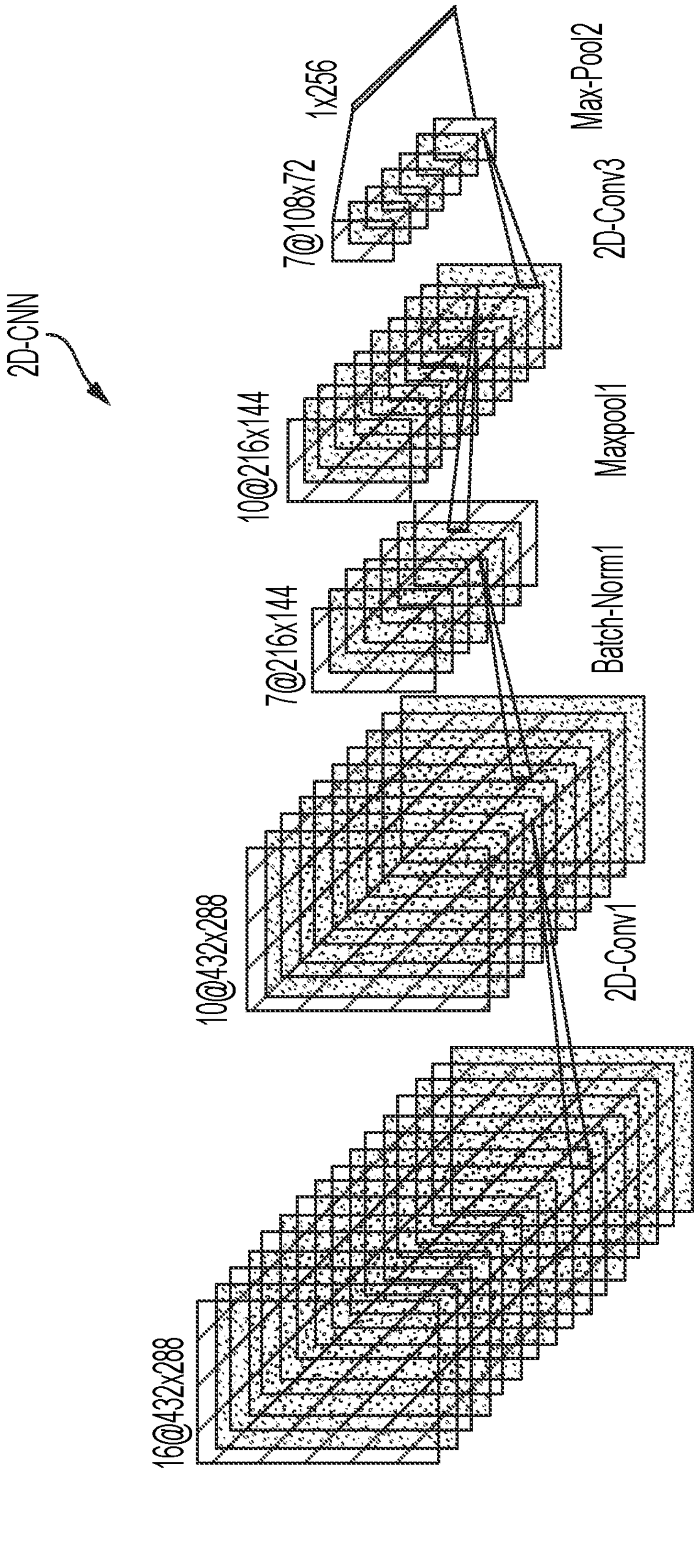
FIG. 5B illustrates a model summary in accordance with aspects of embodiments of the present disclosure.

FIGS. 5A and 5B depict a general 2D-CNN for use in accordance with one or more embodiments of the present disclosure. The architecture may varies based on the structure and/or format input data. In some embodiments, the model takes in image data and outputs a binary prediction. In some embodiments, the 2D-CNN structure shown in FIG. 5B depicts an output shape, layer type and number of parameters of the 2D-CNN of FIG. 5A above.

In some embodiments, the first layer of the CNN is a convolution layer. This layer may be responsible for taking in the input of the image map and performing image filtering to pass on to the next layer. Next, a max pooling layer is used to decrease the filter size by half, leaving the pool size to be a two by two array. The max pooling layer decides which number to utilize by examining the maximum value for each section in the feature map. A batch normalization is then used to standardize the inputs to be zero centered. The last layer before the output layer is the dense layer. This layer contains a sigmoid activation function and receives the input from the convolutional layers. The final output layer converts some non-discrete value to a probability from 0.0 to 1.0. Table 1 below provides an example neural network architecture for use with the features extracted according to aspects of one or more embodiments of the present disclosure.

TABLE 1

| Layer (type) | Output Shape | Param # |
|---|---|---|
| conv2d_1 (Conv2D) | (None, 432, 288, 32) | 160 |
| batch_norm_1 (BatchNormalization) | (None, 432, 288, 32) | 128 |
| max_pool_1 (MaxPooling2D) | (None, 216, 144, 32) | 0 |
| conv2d_2 (Conv2D) | (None, 216, 144, 32) | 6176 |

TABLE 1-continued

| Layer (type) | Output Shape | Param # |
|---|---|---|
| batch_norm_2 (BatchNormalization) | (None, 216, 144, 32) | 128 |
| max_pool_2 (MaxPooling2D) | (None, 108, 72, 32) | 0 |
| dropout_layer_1 (Dropout) | (None, 108, 72, 32) | 0 |
| conv2d_3 (Conv2D) | (None, 108, 72, 32) | 6176 |
| batch_norm_3 (BatchNormalization) | (None, 108, 72, 32) | 128 |
| conv2d_4 (Conv2D) | (None, 108, 72, 32) | 6176 |
| batch_norm_4 (BatchNormalization) | (None, 108, 72, 32) | 128 |
| max_pool_3 (MaxPooling2D) | (None, 108, 72, 32) | 0 |
| dropout_layer_2 (Dropout) | (None, 54, 36, 32) | 0 |
| flatten_layer (Flatten) | (None, 54, 36, 32) | 0 |
| dense_1 (Dense) | (None, 256) | 15925504 |
| Total params: 15,944,704 | | |
| Trainable params: 15,944,448 | | |
| Non-trainable params: 256 | | |
| None | | |

Figure 6A:
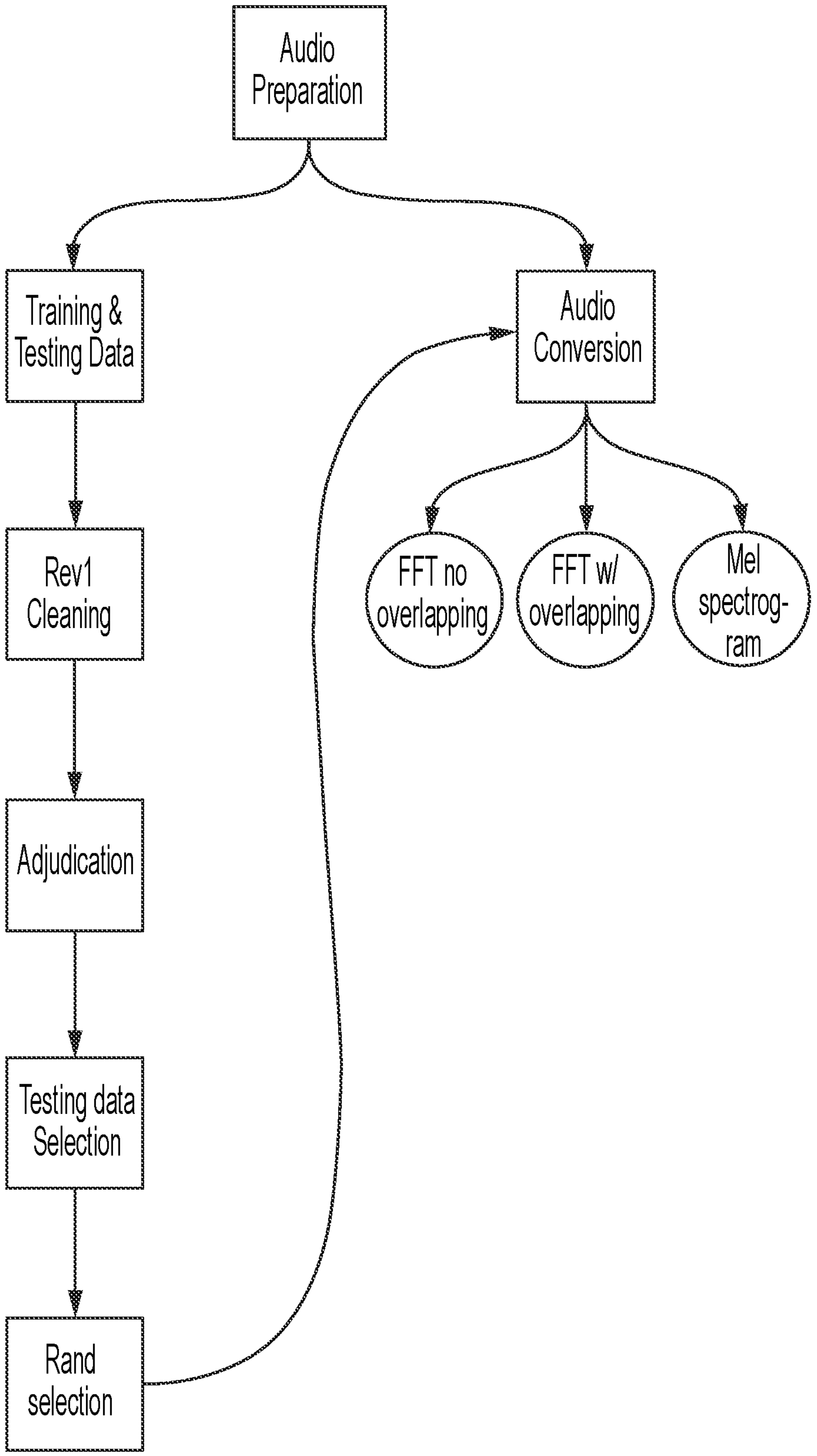
FIG. 6A illustrates the workflow of getting a SDS dataset to preparing the data for training for neural network models in accordance with aspects of embodiments of the present disclosure.

FIG. 6A illustrates the workflow of getting an SDS dataset to preparing the data for training for neural network models in accordance with one or more embodiments of the present disclosure.

Figure 6B:
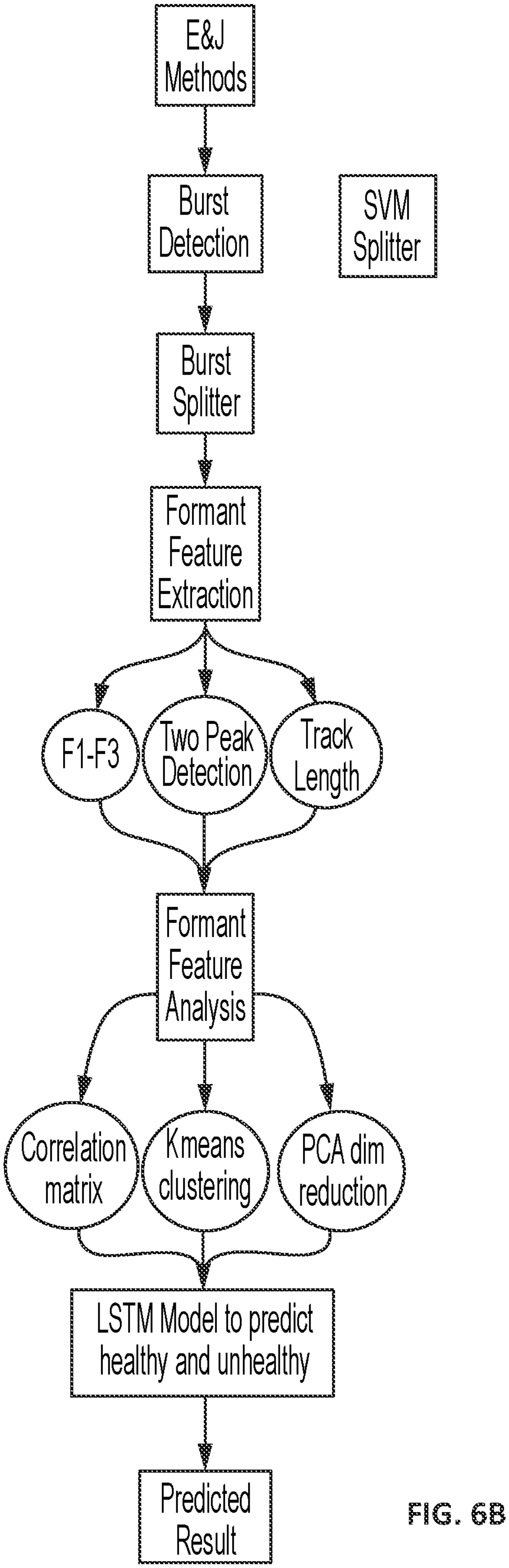
FIG. 6B illustrates feature extraction work applied with subject matter experts in accordance with aspects of embodiments of the present disclosure. The methods are intended to extract features within a SDS sample and predict a final result based on the SDS features

FIG. 6B illustrates feature extraction work applied with subject matter experts. The methods are intended to extract features within a SDS sample and predict a final result based on the SDS features in accordance with one or more embodiments of the present disclosure.

In some embodiments, audio preprocessing may use the creation of training and testing datasets to train one or more models (e.g., the machine learning model(s) 113 and/or 2D-CNN as described above) and test model generality. In some embodiments, pre-processing may include cleansing input audio files, e.g., with automated filters. In some embodiments, the cleansed files may be adjudicated to ensure the files are not altered from an original sample. Once the audio files are processed, the files may be selected into RAND datasets and randomly organized into different datasets. Before the rand selection is run, a testing set may be made that does not have any cross over with any of the rand datasets. If the audio files are to be used for CNN methods, the files may be converted into a representation that can be used by CNN methods such as, e.g., a fast Fourier transform (FFT) with no overlapping, an FFT with overlapping, a Mel spectrogram, or other suitable waveform, spectral image, hyperspectral image, or others or any combination thereof.

In some embodiments, in addition to or instead of Forman features, MFCC coefficients may be determined and analyzed. MFCCs may be more interpretable to both models and humans in a time-series data format, rather than converted to an image. Accordingly, MFCCs may be analyzed without creating a waveform and/or spectral image of the audio. To analyze the MFCCs, a machine learning model that is configured for time-series analysis may be employed such as, e.g., a recurrent neural network (RNN), a long short-term memory (LSTM), or other suitable machine learning model or any combination thereof.

In some embodiments, the splitting methods help segment the audio files into individual cough segments. In some embodiments, the splitting may facilitate standardization of the audio analysis. In some embodiments, analysis is done on an individual audio segment.

In some embodiments, typically, data is not standardized, which presents obstacles to comparing various files to one another. For example, if one sample has 5 coughs in it and another has 10 coughs in it, comparing the two files directly is not a fair comparison, since one has more samples than the other. Moreover, an individual audio segments may have portions without coughs, thus making comparison to other audio segments unreliable.

Figure 7:
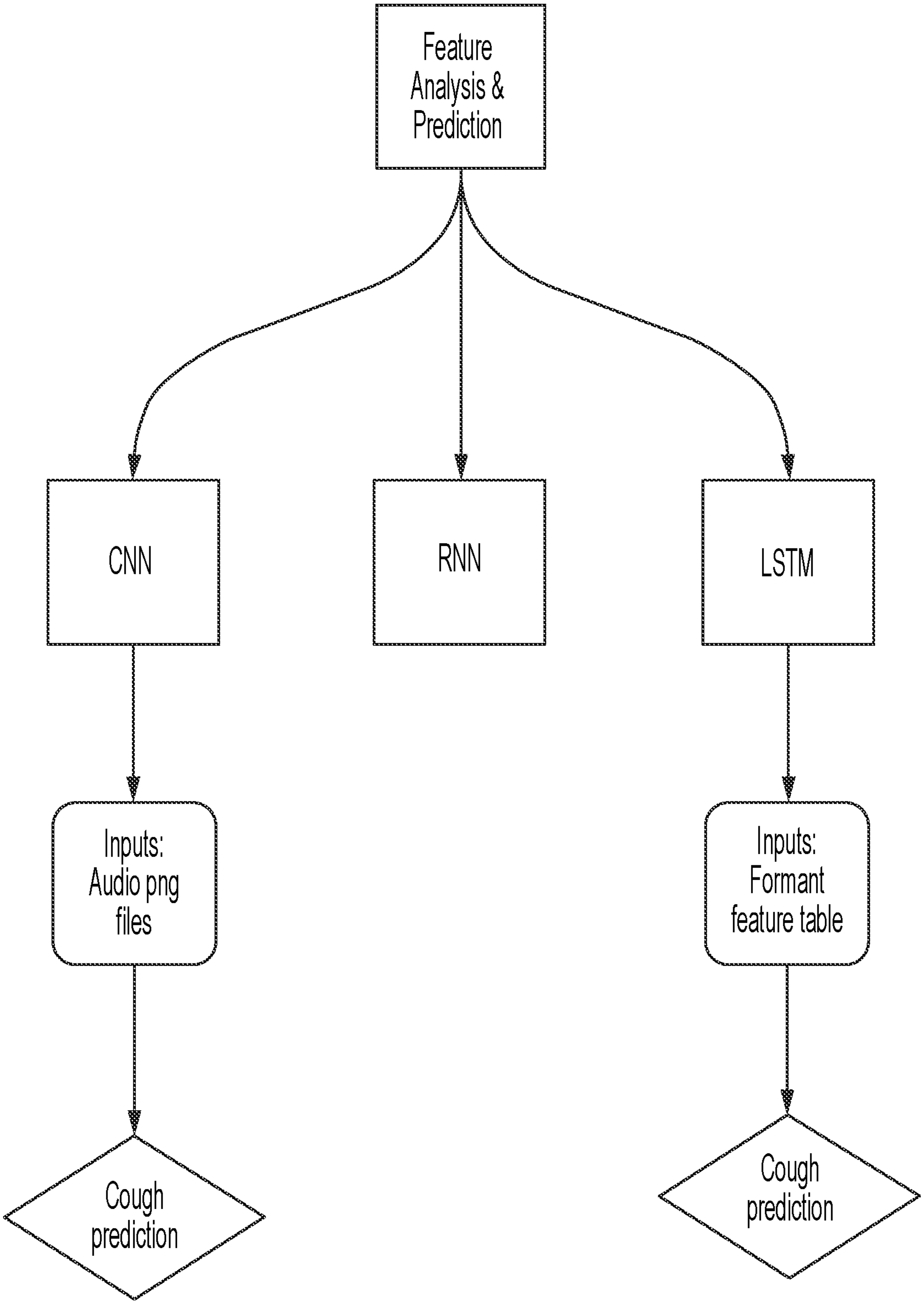
FIG. 7 illustrates various feature extraction and prediction methods in accordance with aspects of embodiments of the present disclosure.

In some embodiments, to solve the above obstacles, a Burst Splitter may split the audio based on a real fast Fourier transform (RFFT) in a provided range. The method calculates the start and end of a burst segment in the audio sample. In some embodiments, a support vector machine (SVM) may be used to correlate cough segments to non-cough segments. In some embodiments, the SVM is an unsupervised learning method, it attempts to draw relations between cough segments and non-cough segments within the audio sample. This provides a solution to segment the audio into “cough-like samples” and non-cough-like samples FIG. 7 illustrates the various feature extraction and prediction methods that are within this patent in accordance with one or more embodiments of the present disclosure In some embodiments, prediction based on the extracted features (e.g., as described above with reference to FIGS. 6A and 6B) may include a suitable machine learning-based processing according to one or more machine learning models. In some embodiments, the machine learning model (s) may include, e.g., a convolutional neural network (CNN), a recurrent neural network (RNN), a long short-term memory (LSTM), or other suitable machine learning model or any combination thereof. In some embodiments, the LSTM (or other suitable statistical model) may be used to predict results based on the formant analysis/features.

In some embodiments, in order to effectively extract the features, the audio may be split into single cough segments. Once the audio is split, formants may then be calculated along with track length, gap length, two peak detection, F1-F3 and more. These features then are analyzed by using methods such as correlation matrices, k-means clustering and PCA to find the most important features and cluster the data. Finally, a LSTM or statistical model can be used to predict whether the features correlate to class 1 or 9.

In some embodiments, the use of Formant features may enable a determination of Fz alterations in a vocalization-related muscle by looking at the level of clarity in the Formants. For example, there may be one class that has a broken F1 while another class has a continuous F1 this could be used in a mathematical model to determine the quality of operation of the vocalization-related muscle and form a distinction between the classes, such as, e.g., the diagnosis of a condition and/or severity of a condition.

In some embodiments, in addition to or instead of Formant features, MFCC coefficients may be determined and analyzed. MFCCs may be more interpretable to both models and humans in a time-series data format, rather than converted to an image. Accordingly, MFCCs may be analyzed without creating a waveform and/or spectral image of the audio. To analyze the MFCCs, a machine learning model that is configured for time-series analysis may be employed such as, e.g., a recurrent neural network (RNN), a long short-term memory (LSTM), or other suitable machine learning model or any combination thereof.

In some embodiments, formant extraction may be performed to extract formant features using mathematical techniques as further detailed below with reference to FIG. 8. In some embodiments, the formants may be analyzed to determine the healthiness of a cough sample.

In some embodiments, classification an unhealthy versus a healthy cough sample is not accurate using traditional machine learning models. Moreover, CNNs may be inefficient and/or inaccurate to train and run for the classification of coughs. In some embodiments, an LSTM may use a formant feature table to determine healthy versus unhealthy coughs for a particular condition (e.g., COVID-19, the common cold, influenzas, bronchitis, pneumonia, etc.). In some embodiments, LSTM, the CNN and the RNN may combine to in any suitable combination to enhance the accuracy of the prediction using corroborating analyses.

Figure 8:
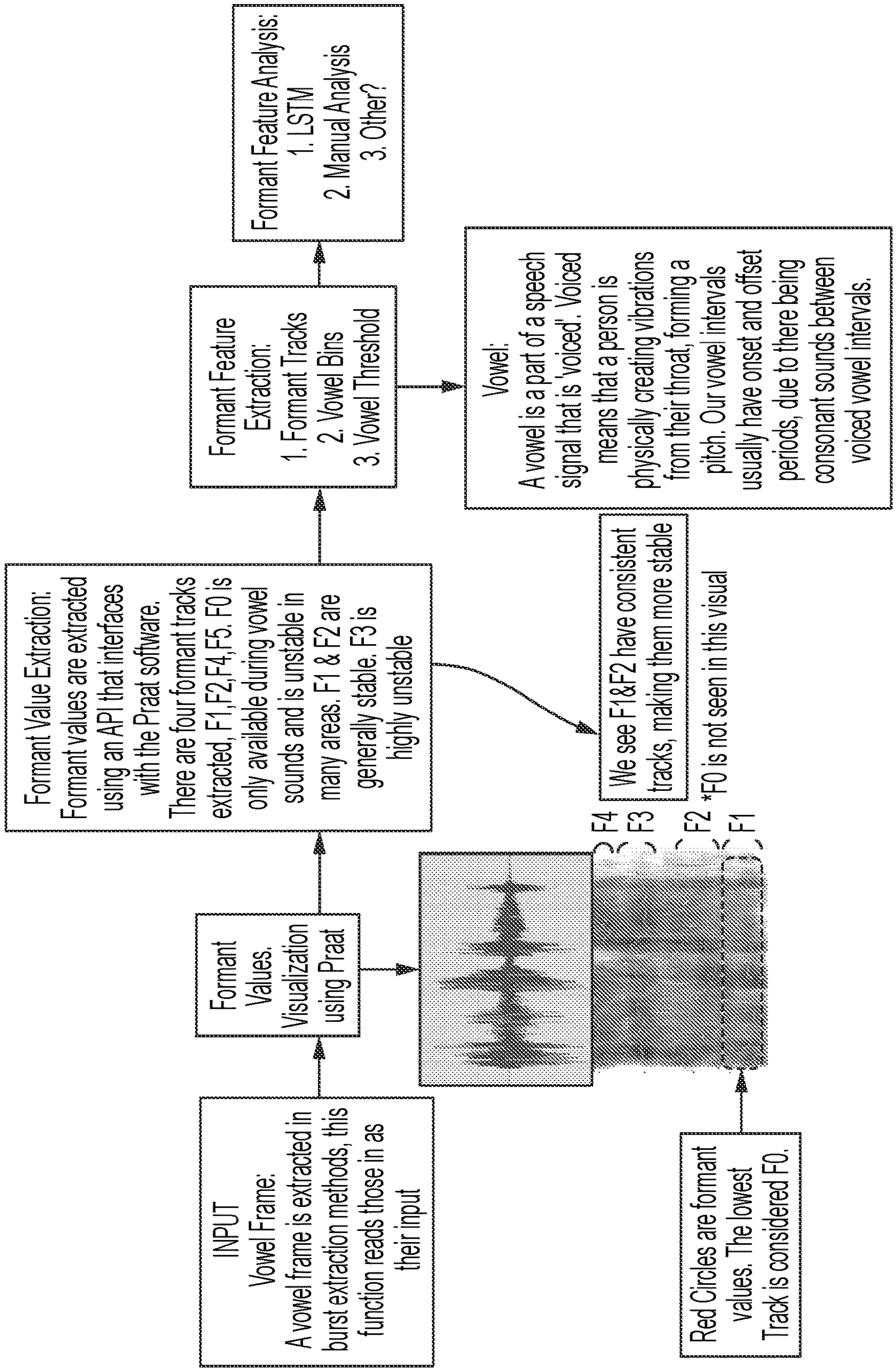
FIG. 8 illustrates cough detection methods used and when to use them on a full length file or a segmented file in accordance with aspects of embodiments of the present disclosure.

FIG. 8 illustrates a detailed process of formant feature extraction in accordance with one or more embodiments of the present disclosure. In some embodiments, formant feature extraction may utilize a file and burst information and mathematical methods to extract the formant tracks. This results in feature information on the file.

In general, the formant feature extraction begins with an input of a vowel frame. A vowel frame is extracted in the burst extraction method and this function is read in as the input. The formant values are extracted from the vowel frame, e.g., through the use of an application programming interface (API) interfacing with the Praat software or using any other suitable software for formant value extraction or any combination thereof. In some embodiments, a set of formant tracks (“formants”) may be extracted, such as, e.g., four formant tracks: F1, F2, F4, and F5. Other numbers of formant tracks may be extracted, such as, e.g., 2, 3, 5, 6, 7, 8, 9, 10 or more. The formants may have consistent tracks, allowing the formants to be more stable, and making them the features extracted for the SDS classification.

In an example definition of the formant tracks, the formant, F0, may be available during the vowel sounds, and/or the formant, F3 may unstable. Thus, in some embodiments, F0 and/or F3 may be considered unreliable features for classification and therefore may not be used.

In some embodiments, the Formant Feature Extraction may include the segmented audio samples being loaded into a script (e.g., Python, Java, C++ or other). After this, a software library may be used extract the desired formants. An example of such a library could be the Python library Parselmouth, a wrapper for Praat. Praat is a professional audio analysis software which is capable of receiving a large amount of information, including formants and fundamental frequencies. Any other suitable software and/or software library may be employed to identify formants and/or fundamental frequencies. In some embodiments, the values for the formants and/or fundamental frequencies may be translated (directly or indirectly) for use by the script.

In some embodiments, the audio segmented data (e.g., segmented as described above) is run through the script and the formants values (F1, F2, and F3) are returned up to a suitable frequency threshold for a suitable time window. The formant values may then be stored for later usage.

In some embodiments, the script may also extract the fundamental frequency (F0) from the sample. Once the fundamental frequency (F0) and the three formants (F1, F2, and F3) are stored, a track analysis is performed on the formant sequences. This analysis may include the walking through of the formant values sequentially, and the determination of the formant tracks and formant gaps within the interval of interest. The formant track is defined as a series of formants which have similar frequencies and move along on a single track.

In some embodiments, a formant track may be produced using a maximum jump threshold between one formant value, and the next formant value (according to the time window, e.g., 0.01 seconds later). The maximum jump is calculated by finding the difference between a formant value and the next formant value, and then calculating if that difference is within 1 or 2 bins above or below the first formant.

In some embodiments, a formant track may be produced using a percent difference as a threshold value to determine if the next formant is a continuation of a track. A gap may be defined as a window where the formant or pitch does not exist. In some embodiments, the script may return a not-a-number (NaN) value when a formant or pitch does not exist within the time window in the sample. Gaps are calculated by finding NaNs in between two formant tracks (internal gaps). These gaps can be a single time step long, or many timesteps. NaN values that are before the first formant track, or after the last formant track are disregarded due to inaccuracies that may occur at the end of a sequence.

In some embodiments, once tracks are found within a burst interval, statistics may be populated into a data table. These statistics include the total number of tracks, the total number of gaps, lengths of tracks greater than fiver, track length average, and gap length average. These statistics are then analyzed and used as predictive features for classification.

In some embodiments, a two peak detector may be employed to analyze a directory of cough samples. The input may include a suitable cough sample recorded in a suitable audio file format (e.g., .wav, .mp3, .mp4, .flac, .ogg, .aac, etc.). The two peak detector utilizes a threshold in order to detect two energy peaks within a predetermined separation threshold of each other at the onset of a cough. The two peak detector returns a true or false value for every cough sample regarding the presence of double peaks or not. This value provides an additional usable feature within the audio sample to determine the presence of acute or chronic respiratory illnesses.

In some embodiments, in order to extract a formant slurred feature, the process may begin with loading the F1 and F2 frequency sequences. Upon F1 and F2 being loaded, the frequency values which the sequences share may be detected. Both the F1 and F2 frequencies are defined to have a tolerance surrounding their frequency values. The two formants may be examined within the same time window, and if a value from either formant is within the time window, the timestamp may be counted as a mixed formant. This examination is performed for every time window corresponding to F1 and F2 frequency values. Once every time window is examined, a percentage is calculated for the amount of time frames which are considered mixed over the total amount of time frames within the sequence. This final percentage gives the formant slurring feature, corresponding to the percentage similarity between F1 and F2.

In some embodiments, as shown in FIG. 6B, FIG. 7 and/or FIG. 8, the extraction features may be analyzed with a suitable model, including a machine learning model, neural network and/or statistical model, to analyze the features. In some embodiments, the model may include a long short-term memory (LSTM) based neural network. In some embodiments, the features may be calculated on a frame-by-frame (e.g., segment by segment as described with reference to FIG. 4 above) basis and can be fed into the model for examination. The model applies weights to the features to correlate features with classes based on a best match. In some embodiments, the Feature Extraction may utilize one or more feature extraction machine learning models, such as, e.g., one or more convolutional neural networks, recurrent neural networks, decision trees, random forests, support vector machines (SVMs), autoencoders, among others or any combination thereof. In some embodiments, by training the feature extraction machine learning models to look for features (e.g., features the feature extraction machine learning models deem significant enough to establish a class), new SDS segments are then compared to the feature extraction machine learning models to output a score.

In some embodiments, LSTM networks are a type of RNN that uses special units in addition to standard units. LSTM units include a 'memory cell' that can maintain information in memory for long periods of time. A set of gates is used to control when information enters the memory when it's output, and when it's forgotten. In some embodiments, the types of gates may include, e.g., input gate, output gate and forget gate. In some embodiments, the input gate may decide how much information from the last sample will be kept in memory; the output gate regulates the amount of data passed to the next layer, and forget gates control the tearing rate of memory stored. This architecture enables LSTM units to learn longer-term dependencies. Accordingly, each successive segment may be mapped to a class based on the features of each segment as well as the information from preceding segments. Thus, earlier analyzed segments may affect later analyzed segments for time-dependent feature analysis.

In some embodiments, feature analysis classifies disease related alterations in muscle function in the resonance chamber. Each combination of muscular dysfunctions provides a pathognomonic signature that can be used to differentiate different disease states as well as the level of disease intensity.

Figure 9:
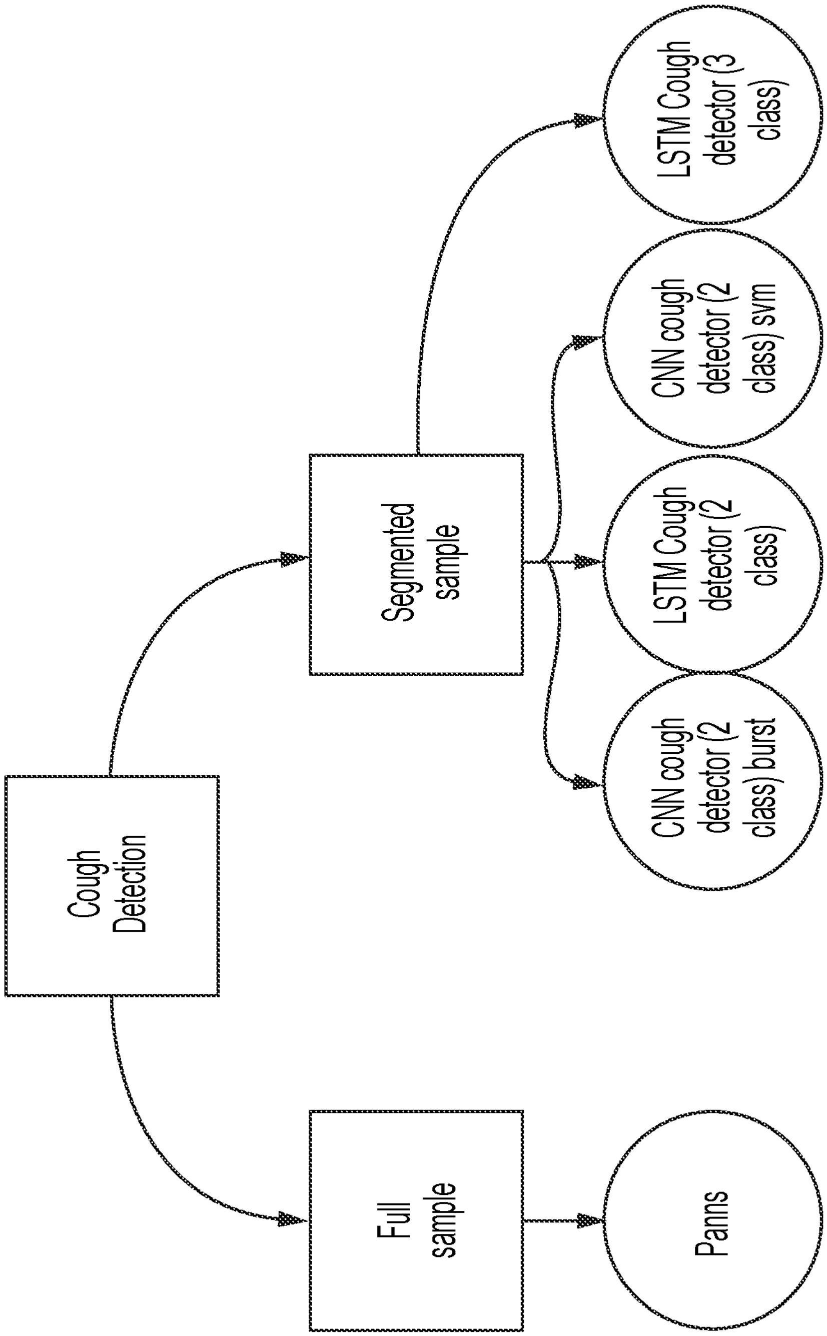
FIG. 9 illustrates a detailed process of formant feature extraction in accordance with aspects of embodiments of the present disclosure.

FIG. 9 illustrates details the cough detection methods used and when to use them on a full length file or a segmented file in accordance with one or more embodiments of the present disclosure.

In some embodiments, cough detection may be performed on an entire (unsplit) file by file basis when audio files are loaded into the database (e.g., data sources 108). After segments are split, a prediction may be performed that identifies parasitic sounds left over within the data. In some embodiments, the cough detection may remove audio samples that are not considered to be a cough sample. Moreover, pretrained audio neural networks (PANNs) detection may be employed for audio pattern recognition to detect coughs in the full sample recording.

Figure 10:
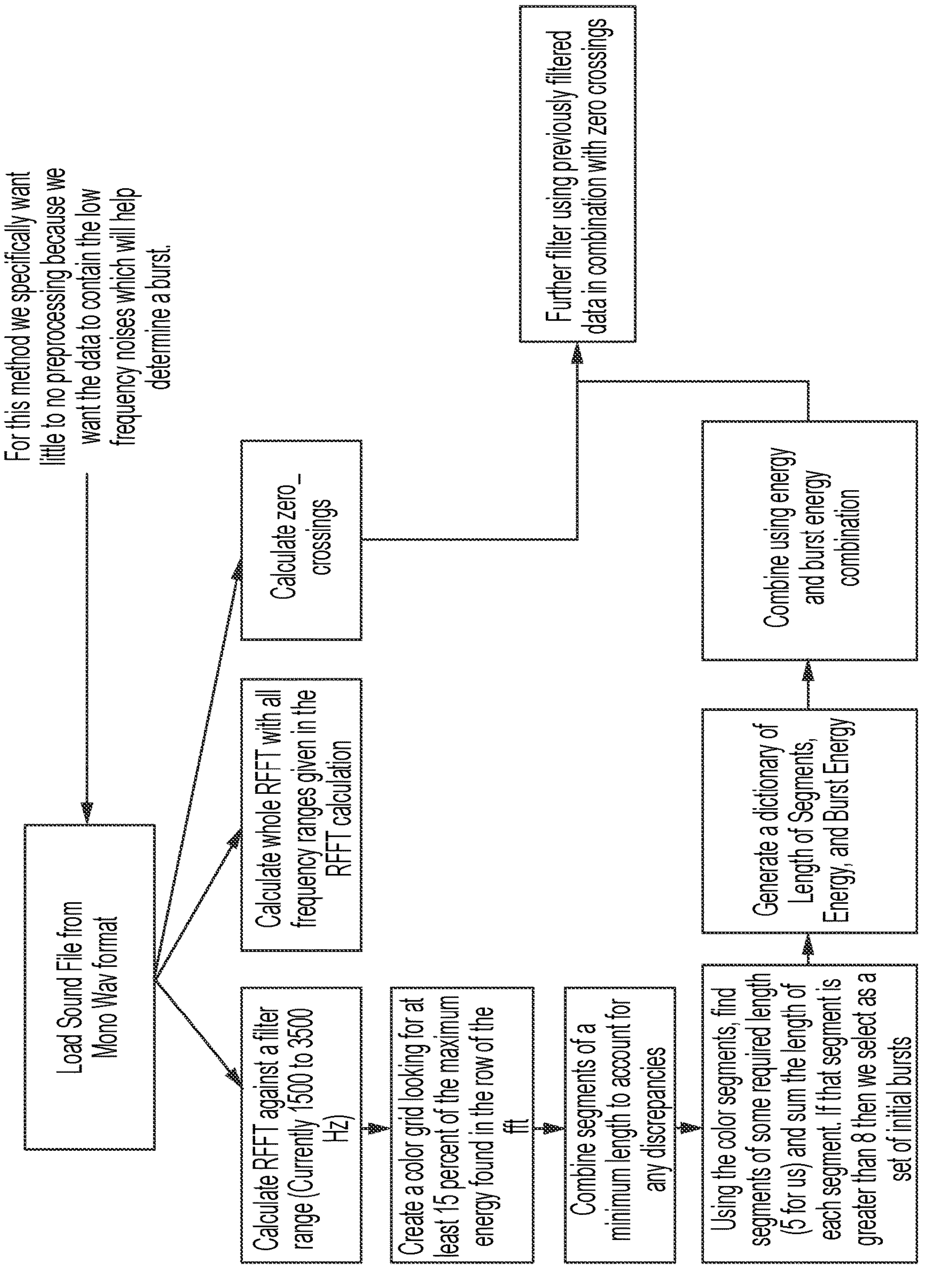
FIG. 10 illustrates a burst detection pipeline to detect and extract bursts in an audio sample in accordance with one or more embodiments of the present disclosure.

FIG. 10 illustrates a burst detection pipeline to detect and extract bursts in an audio sample in accordance with one or more embodiments of the present disclosure.

In some embodiments, burst detection may be used as a splitting method for audio samples. The bursts can be defined and tuned to specific audio types such as, e.g., cough, laugh, sneeze, etc. The bursts may then be used to define the onset and offset of these audio types in the sample. Accordingly, the detection of bursts may be enable segmentation of the audio samples to extract portions associated with the specific audio types.

In some embodiments, the burst detection may be used to determine the existence of an audio event within a sample. If there are no bursts detected, then the audio file may not be useful for analysis and therefore can be excluded from the dataset.

Figure 11:
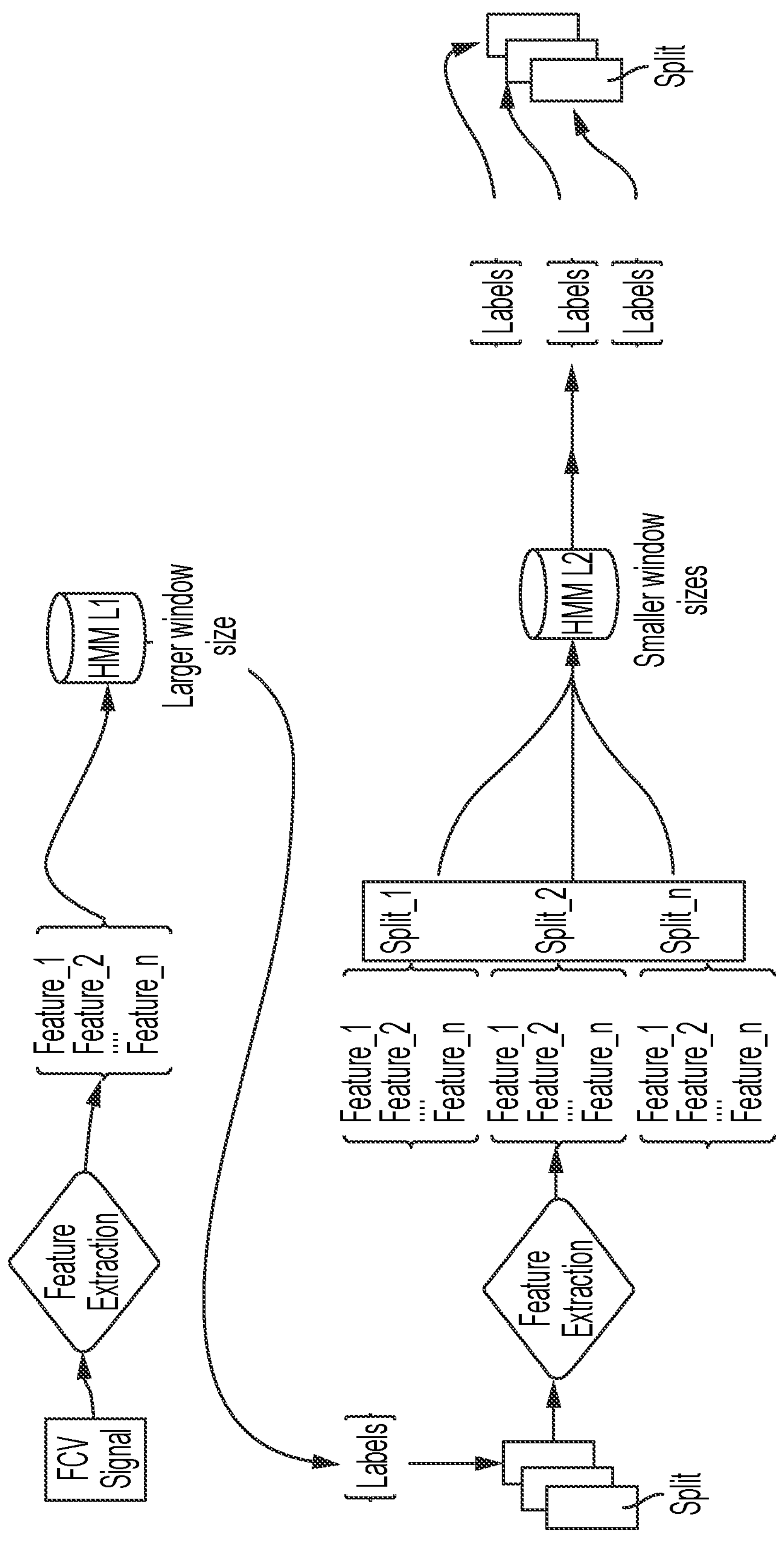
FIG. 11 illustrates a process of an FCV through the layered HMM pipeline for audio recording splitting in accordance with one or more embodiments of the present disclosure.
Figures 1, 12A:
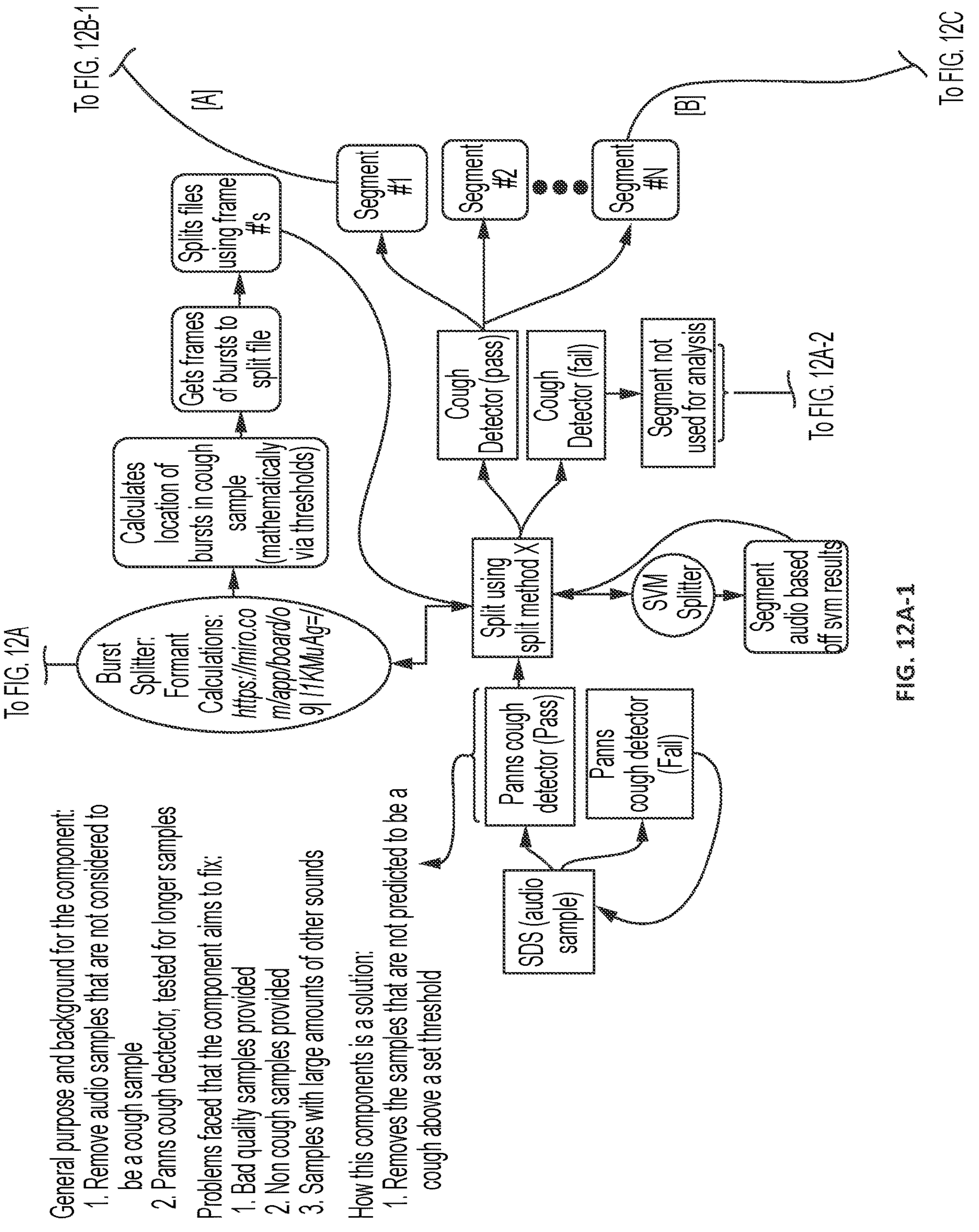
Figures 1, 12B:
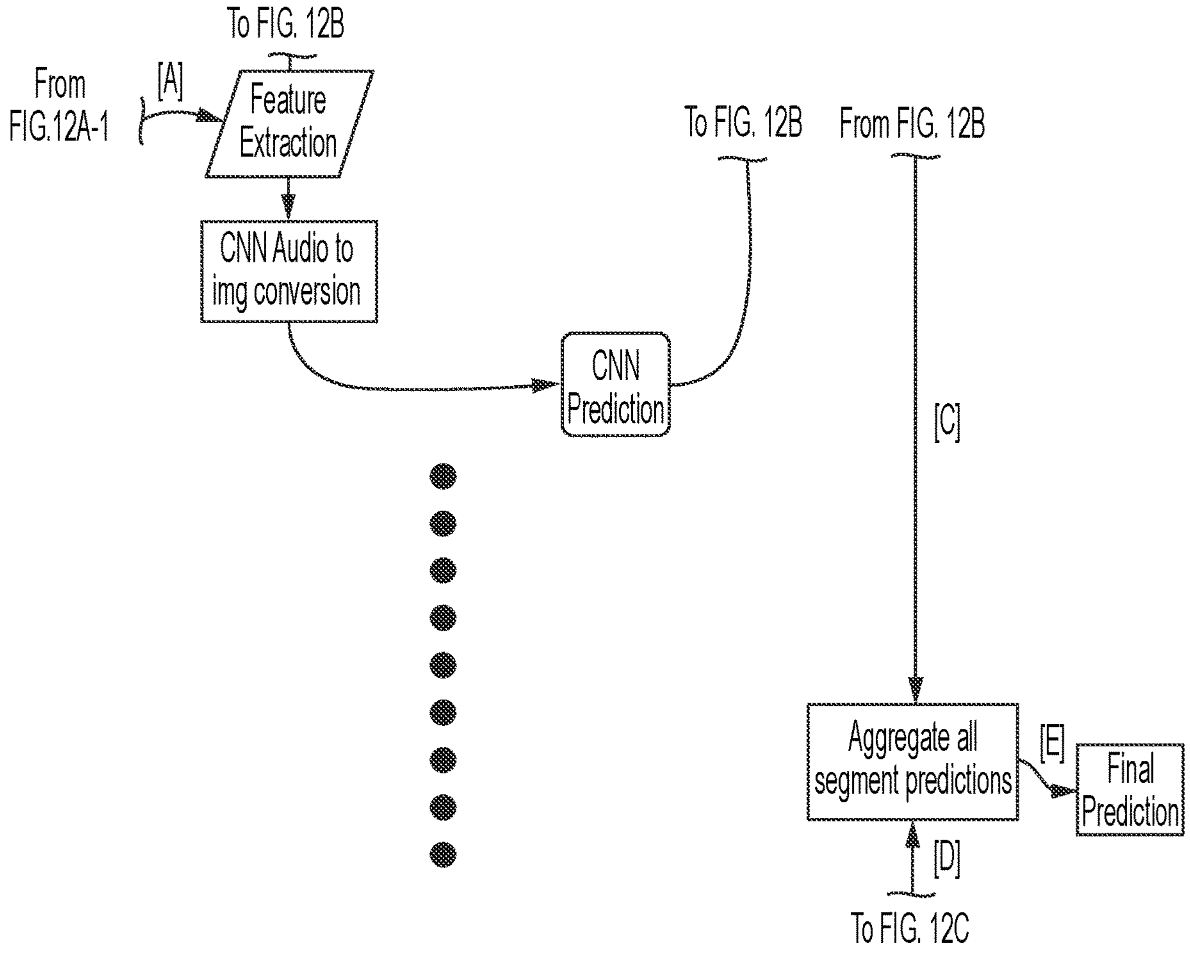
Figure 12C:
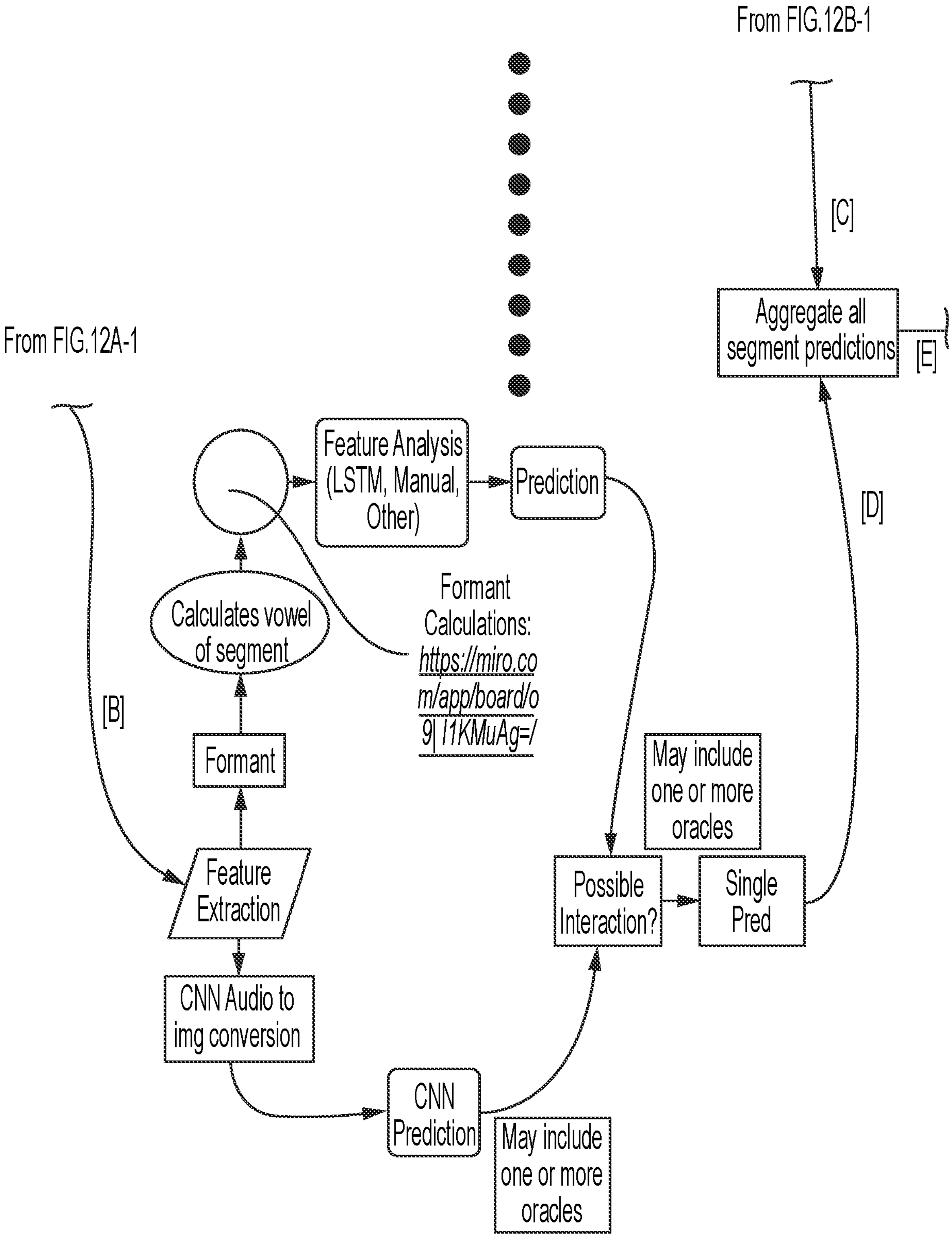

FIG. 11 illustrates a process of an FCV through the layered HMM pipeline for audio recording splitting in accordance with one or more embodiments of the present disclosure. In some embodiments, using a layered HMM pipeline utilizing two, three, four or more layers of HMMs may enable an improvement for audio splitting by adding granularity to the segmentation.

In some embodiments, when ingesting a SDS into the system, the SDS may be cleaned/preprocessed before being sent downstream for analysis/ML. In some embodiments, preprocessing within the system may include segmenting the SDS. Segmenting is the act of cutting a SDS into smaller, more specific slices. These slices may include the pieces of a SDS characteristic of a signal data of interest, such as, for audio SDS, cough sounds, sneeze sounds, vocalizations, breath sounds, heart beats, among other time-series data having signal data of interest or any combination thereof.

Within a given SDS, there may be instances of parasitic information such as: background noise, speech, and sounds different from the signal data of interest (e.g., non-cough sounds, etc.). In some embodiments, a segmentation engine may employ a segmenting process to filter out all of parasitic phenomena, and export only slices/segments having the signal data of interest. In some embodiments, a given slice exported by the segmentation engine may have one instance of the signal data of interest (e.g., one cough, one sneeze, one breath, one heart beat, etc.). Allowance of multiple instances, or an instance trailed by noise within a single slice can cause ambiguity and general confusion when training neural networks.

In some embodiments, the segmentation engine may employ a Hidden Markov Model (HMM) as the base model in which to train the segmentation process. A SDS can be modeled as a Markov process due to the nature of a signal changing states over time. For example, there may be three states that can model a given SDS being input into the system: Instance state for signal data of interest, Silence state for no signal data or negligible signal data, and Noise state for signal data having parasitic information. In some embodiments, other states may be defined to model aspects of the SDS. In some embodiments, the Hidden Markov Model may predict changes in these states based on features of the signal. For example, if there is 5 seconds of silence, then a user provides an input data (e.g., a forced cough vocalization, cough, sneeze, forced breath vocalization, breath sounds, heartbeat sounds, heart rate data, or other input signal data for any suitable time-series data), the model may predict the probability of a state change from silence to an instance of signal data of interest at the 5 second mark of the SDS.

In some embodiments, the HMM may provide the best results for cases when there are clear transitions between each of the three states. A single HMM architecture may have less accuracy when one state blends into another, or there is a change between two states that is subtle enough to not be detected by a single HMM. Due to features being extracted in set time windows, there is a lack of precision when states very quickly change. An example of may be when there is a rapid sequence of peaks one after another. The states in which one peak ends, there is very brief silence, and another starts might occur within the same window, forcing the model to only predict one state for all 3 changes.

In some embodiments, the problem of detecting rapid sequences of peaks may be overcome by a layered HMM architecture. An SDS is first segmented using a first layer HMM with a relatively large window size, allowing for generalizability over an entire signal. The resulting segments may then be provided to a second layer HMI with a much smaller window size than the first layer HMM, allowing for greater precision. In the case of a rapid sequence of peaks, the first layer HMM may cut the entire sequence and label it as peak, and that sequence may be passed to the more precise second layer HMI, which may further segment the sequence into multiple single peak sounds.

In some embodiments, a mechanism to determine whether the segments from the first layer HMM are to be sent to the second layer HMM may include a duration filter. If a segment from the first layer HMI is greater than a predefined duration, it may be likely that segment includes more than a single instance of the signal data of interest. Thus, that segment may sent to the second layer HMM for fine-tuning.

In some embodiments, the layered HMI may be used for data cleaning purposes by splitting audio samples based on candidate events in the first layer and then furthering the splitting of the candidate event in the second layer. Such an arrangement may be used to improve the quality of audio samples, for example someone with a laugh, the first layer may split the laughs between the inhales of the sample while the second layer could extract the peaks of the laugh, adding a level of granularity to the data.

In some embodiments, an FCV signal is provided to a feature extractor for feature extractor as described above, e.g., with respect to FIG. 4, 5A, 5B, 6A, 6B, 7, 8 etc. above. The features may be provided to a first layer hidden Markov model (HMM). The first layer HMM may use a larger window size than later HMI layers for faster more efficient but less granular audio segmentation. Accordingly, the first layer HMM may segment the FCV signal into multiple relatively large windows determine a label for each window based on the features. Segments of consecutive windows having a common label may be grouped together to form segments of the FCV signal. The FCV signal may then be split according to the segments of grouped windows.

In some embodiments, each segment may undergo feature extraction as described above and then may each be provided to a second layer HMI. The layered HMI can be used to increase the total number of available samples within the data set. In some embodiments, the second layer HMM may use a window smaller than the first layer HMI in order to further segment each segment. The final labels for the sub-segments produced by the second layer HMM may be applied to the FCV signal to determine split points based on consecutive labels for the sub-segments. In some embodiments, any additional number of layers of HMI may be included based on a balancing of processing time, resource use and granularity of segmentation.

In some embodiments, by splitting the data twice, the layered HMM can increase the total number of files available for training. Increasing the total number of files may become useful when training on limited data samples. In some embodiments, the layered HMM can be used to separate rapid sequences of coughs. The first layer HMM may group multiple coughs into a single segment, due to there being no perceived break between them. The second layer HMM may further segment the cough sequence into individual coughs, allowing for more accurate splits to be passed to the classifiers.

In some embodiments, some technical obstacles that the cough detection solves is inaccuracies and errors as a result of low quality samples, non-cough samples, and samples having noise or other sounds recorded therein.

In some embodiments, the cough detection may remove the samples that are not predicted to be a cough above a set threshold, thus removing non-cough samples, noise, etc. for fewer errors and more accurate processing and prediction.

In some embodiments, the cough detector may include a first models trained on segmented cough samples for user with a segmented audio recording. In some embodiments, the cough detector may include a second model for prediction within a full (not segmented) sample.

In some embodiments, after segmentation, there are parasitic samples that are just noise. Additionally, after segmentation, some samples may not be cough sounds. Both parasitic samples and non-cough sounds may lead to incorrect behavior by the model. Thus, the first model may work on the smaller, segmented samples, while the second model may employ PANNs on the non-segmented sample. In some embodiments, the first model may improve the data quality after the segmentation has been complete by removing bad or parasitic samples.

In some embodiments, the first model may include one or more cough detector models for detecting coughs. For example, the first model may include a burst classifier including, e.g., a CNN or other suitable classifier, an LSTM (e.g., as described above) or other suitable statistical model, an SVM (e.g., as described above), and/or a LSTM.

FIG. 12A, FIG. 12A-1, FIG. 12A-2, FIG. 12B, FIG. 12B-1, FIG. 12C and FIG. 12C-1 illustrate a schematic for the process of SDS audio sample to a final prediction. Currently it shows the combination of audio collection, cough detection, audio segmentation, 2D-CNN, and Formant Feature extraction to achieve a final prediction in accordance with aspects of embodiments of the present disclosure.

Figure 13:
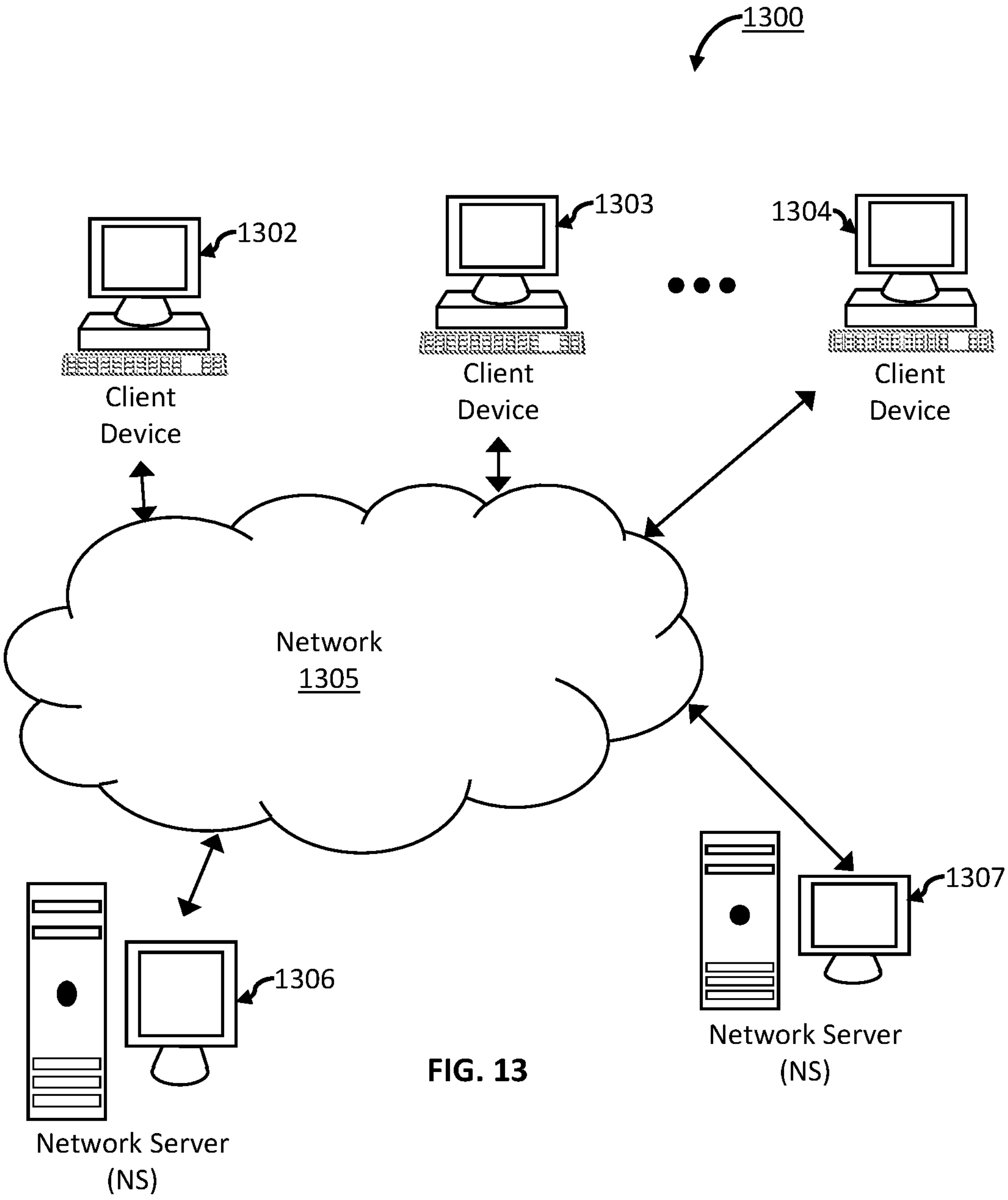
FIG. 13 depicts a block diagram of an exemplary computer-based system and platform for acoustic feature extraction in accordance with one or more embodiments of the present disclosure.

FIG. 13 depicts a block diagram of an exemplary computer-based system and platform 1300 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 1300 may be configured to manage a large number of members and concurrent transactions, as detailed herein. In some embodiments, the exemplary computer-based system and platform 1300 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 13, member computing device 1302, member computing device 1303 through member computing device 1304 (e.g., clients) of the exemplary computer-based system and platform 1300 may include virtually any computing device capable of receiving and sending a message over a network (e.g., cloud network), such as network 1305, to and from another computing device, such as servers 1306 and 1307, each other, and the like. In some embodiments, the member devices 1302-1304 may be personal computers, multiprocessor systems, microprocessor-based or programmable consumer electronics, network PCs, and the like. In some embodiments, one or more member devices within member devices 1302-1304 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 1302-1304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 1302-1304 may include may run one or more applications, such as Internet browsers, mobile applications, voice calls, video games, videoconferencing, and email, among others. In some embodiments, one or more member devices within member devices 1302-1304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 1302-1304 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 1302-1304 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 1305 may provide network access, data transport and/or other services to any computing device coupled to it. In some embodiments, the exemplary network 1305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 1305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 1305 may include and implement, as an alternative or in conjunction with one or more of the above, a WiMAX architecture defined by the WiMAX forum. In some embodiments and, optionally, in combination of any embodiment described above or below, the exemplary network 1305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network

1305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 1305 may also include mass storage, such as network attached storage (NAS), a storage area network (SAN), a content delivery network (CDN) or other forms of computer or machine readable media.

In some embodiments, the exemplary server 1306 or the exemplary server 1307 may be a web server (or a series of servers) running a network operating system, examples of which may include but are not limited to Apache on Linux or Microsoft IIS (Internet Information Services). In some embodiments, the exemplary server 1306 or the exemplary server 1307 may be used for and/or provide cloud and/or network computing. Although not shown in FIG. 13, in some embodiments, the exemplary server 1306 or the exemplary server 1307 may have connections to external systems like email, SMS messaging, text messaging, ad content providers, etc. Any of the features of the exemplary server 1306 may be also implemented in the exemplary server 1307 and vice versa.

In some embodiments, one or more of the exemplary servers 1306 and 1307 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 1301-1304.

In some embodiments and, optionally, in combination of any embodiment described above or below, for example, one or more exemplary computing member devices 1302-1304, the exemplary server 1306, and/or the exemplary server 1307 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 14:
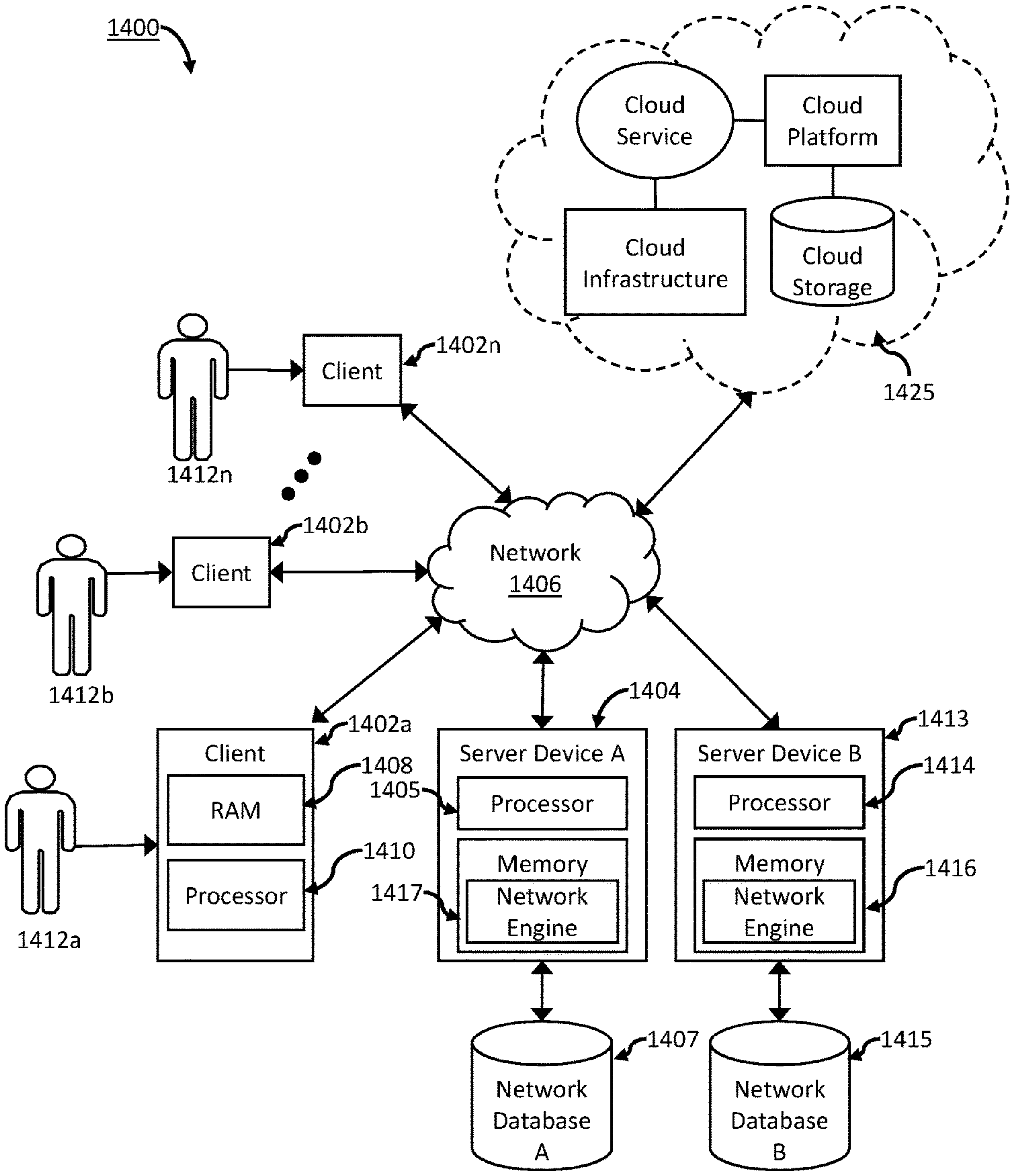
FIG. 14 depicts a block diagram of another exemplary computer-based system and platform for acoustic feature extraction in accordance with one or more embodiments of the present disclosure.

FIG. 14 depicts a block diagram of another exemplary computer-based system and platform 1400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 1402*a*, 1402*b* thru 1402*n* shown each at least includes a computer-readable medium, such as a random-access memory (RAM) 1408 coupled to a processor 1410 or FLASH memory. In some embodiments, the processor 1410 may execute computer-executable program instructions stored in memory 1408. In some embodiments, the processor 1410 may include a microprocessor, an ASIC, and/or a state machine. In some embodiments, the processor 1410 may include, or may be in communication with, media, for example computer-readable media, which stores instructions that, when executed by the processor 1410, may cause the processor 1410 to perform one or more steps described herein. In some embodiments, examples of computer-readable media may include, but are not limited to, an electronic, optical, magnetic, or other storage or transmission device capable of providing a processor, such as the processor 1410 of client 1402*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 1402*a* through 1402*n* may also comprise a number of external or internal devices such as a mouse, a CD-ROM, DVD, a physical or virtual keyboard, a display, or other input or output devices. In some embodiments, examples of member computing devices 1402*a* through 1402*n* (e.g., clients) may be any type of processor-based platforms that are connected to a network 1406 such as, without limitation, personal computers, digital assistants, personal digital assistants, smart phones, pagers, digital tablets, laptop computers, Internet appliances, and other processor-based devices. In some embodiments, member computing devices 1402*a* through 1402*n* may be specifically programmed with one or more application programs in accordance with one or more principles/methodologies detailed herein. In some embodiments, member computing devices 1402*a* through 1402*n* may operate on any operating system capable of supporting a browser or browser-enabled application, such as Microsoft™, Windows™, and/or Linux. In some embodiments, member computing devices 1402*a* through 1402*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 1402*a* through 1402*n*, users, 1412*a* through 1402*n*, may communicate over the exemplary network 1406 with each other and/or with other systems and/or devices coupled to the network 1406. As shown in FIG. 14, exemplary server devices 1404 and 1413 may include processor 1405 and processor 1414, respectively, as well as memory 1417 and memory 1416, respectively. In some embodiments, the server devices 1404 and 1413 may be also coupled to the network 1406. In some embodiments, one or more member computing devices 1402*a* through 1402*n* may be mobile clients.

In some embodiments, at least one database of exemplary databases 1407 and 1415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 15:
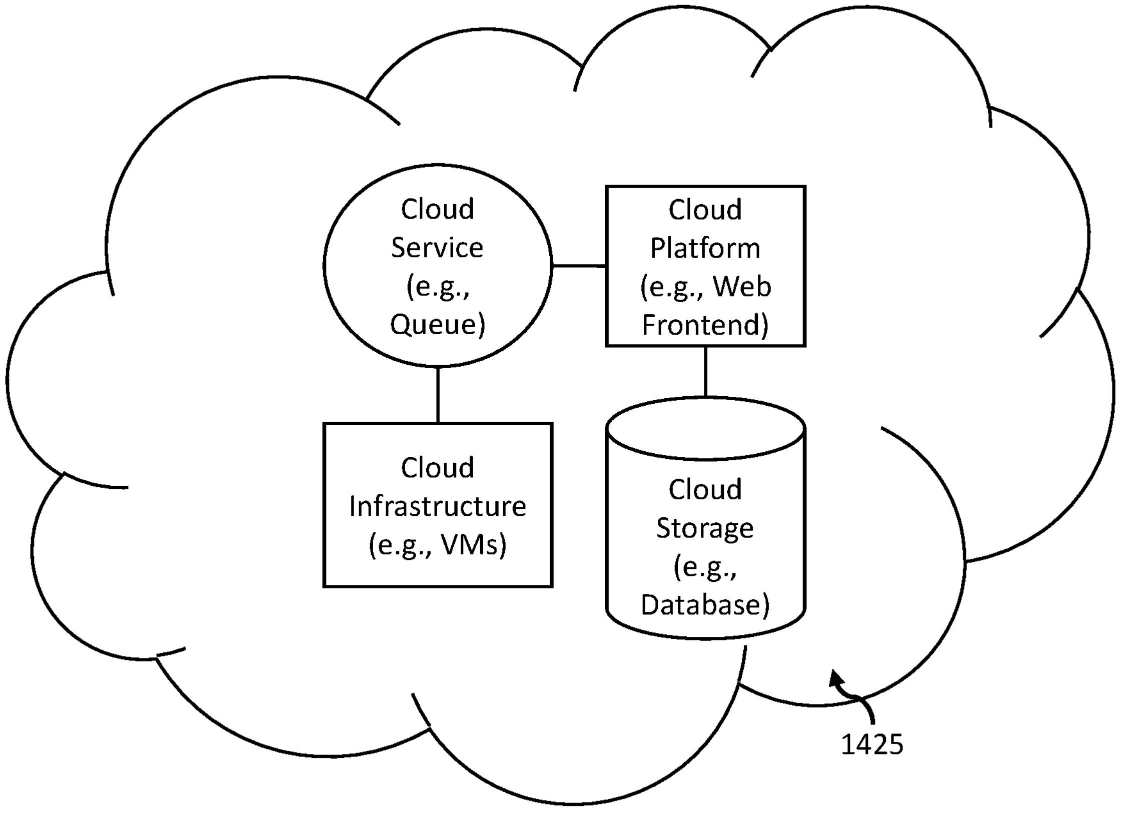
FIG. 15 depicts illustrative schematics of an exemplary implementation of the cloud computing/architecture(s) in which embodiments of a system for acoustic feature extraction may be specifically configured to operate in accordance with some embodiments of the present disclosure.
Figure 16:
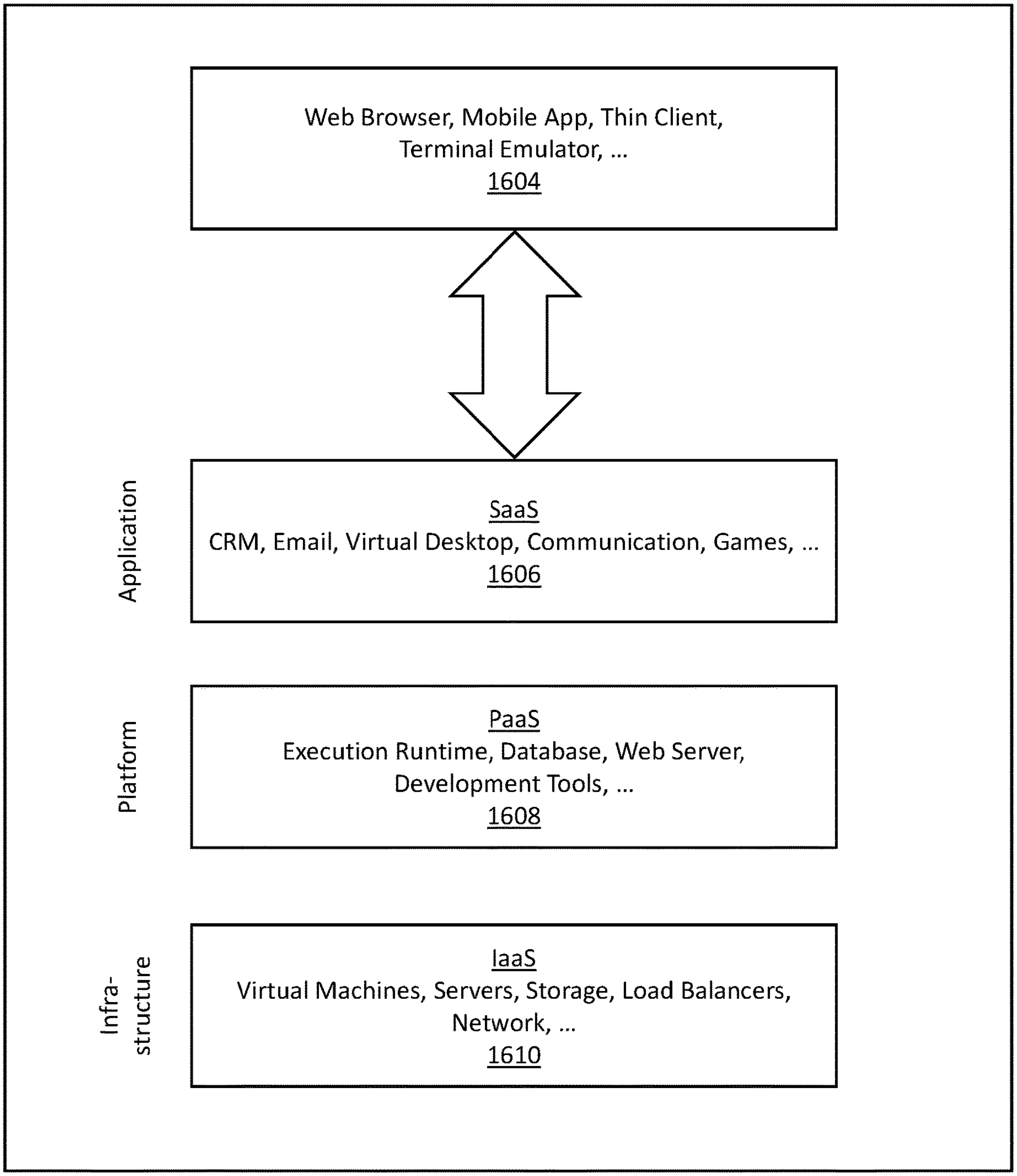
FIG. 16 depicts illustrative schematics of another exemplary implementation of the cloud computing/architecture(s) in which embodiments of a system for acoustic feature extraction may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 1425 such as, but not limiting to: infrastructure a service (IaaS) 1610, platform as a service (PaaS) 1608, and/or software as a service (SaaS) 1606 using a web browser, mobile app, thin client, terminal emulator or other endpoint 1604. FIGS. 15 and 16 illustrate schematics of exemplary implementations of the cloud computing/architecture(s) in which the exemplary systems of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RCS, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising:

receiving, by a processor, a signal data signature comprising time-varying data;

wherein the time-varying data comprises at least one event of interest;

utilizing, by the processor, a first trained Hidden Markov model (HMM) to segment the signal data signature into at least one segment of the time-varying data;

wherein the first trained HMM comprises first parameters trained to identify state changes indicative of events of interest within windows of historical time-varying data;

wherein the at least one segment of the time-varying data comprises a first length;

utilizing, by the processor, a second trained Hidden Markov model (HMM) to segment the at least one segment into at least one sub-segment of the time-varying data;

wherein the second trained HMM comprises second parameters trained to identify the state changes indicative of the events of interest within sub-windows of the windows of the historical time-varying data;

wherein the at least one sub-segment of the time-varying data comprises a second length;

outputting, by the processor, the at least one sub-segment of the time-varying data to represent at least one instance of the at least one event of interest.

Clause 2. The method of clause 1, further comprising:

determining, by the processor, that the at least one segment of the time-varying data is greater than a threshold length; and utilizing, by the processor in response to the at least one segment of the time-varying data being greater than a threshold length, the second trained Hidden Markov model (HMM) to segment the at least one segment into the at least one sub-segment of the time-varying data.

Clause 3. The method of clause 2, wherein the threshold length comprises 5 seconds.

Clause 4. The method of clause 1, wherein the state changes is associated with at least one state comprises at least one of:

an event state associated with the events of interest, a null state associated with no events, or a noise state associated with events not of interest.

Appendix A, attached herewith, provides an exemplary protocol including aspects of one or more embodiments of the present disclosure.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by a processor, a signal data signature comprising time-varying data;

wherein the time-varying data comprises at least one candidate event of interest;

utilizing, by the processor, a first trained Hidden Markov model (HMM) to segment the signal data signature into at least one segment of the time-varying data;

wherein the first trained HMM comprises first parameters that are trained and used by the first trained HMM to identify state changes indicative of events of interest within windows of historical time-varying data;

wherein the at least one segment of the time-varying data comprises a first length;

utilizing, by the processor, a second trained Hidden Markov model (HMM) to segment the at least one segment of the time-varying data into at least one sub-segment of the time-varying data;

wherein the second trained HMM comprises second parameters that are trained and used by the second trained HMM to identify the state changes indicative of the events of interest within sub-windows of the windows of the historical time-varying data;

wherein the at least one sub-segment of the time-varying data comprises a second length;

outputting, by the processor, the at least one sub-segment of the time-varying data to represent at least one instance of the at least one candidate event of interest.

2. The method of claim 1, further comprising:

determining, by the processor, that the at least one segment of the time-varying data is greater than a threshold length; and utilizing, by the processor in response to the at least one segment of the time-varying data being greater than a threshold length, the second trained Hidden Markov model (HMM) to segment the at least one segment into the at least one sub-segment of the time-varying data.

3. The method of claim 2, wherein the threshold length comprises 5 seconds.

4. The method of claim 1, wherein the state changes is associated with at least one state comprises at least one of:
an event state associated with the events of interest,
a null state associated with no events, or
a noise state associated with events not of interest.

5. The method of claim 1, further comprising:
determining, by the processor, at least one Formant of the at least one sub-segment based at least in part on the time-varying data;
generating, by the processor, at least one sub-segment feature vector encoding the at least one Formant;
inputting, by the processor, the at least one sub-segment feature vector into a signature classification neural network to output a probability of the at least one candidate event of interest being at least one event of interest;
wherein the signature classification neural network comprises a plurality of trained classification parameters trained to model a correlation between a plurality of historical time-varying data and at least one event class representative of the at least one event of interest;
filtering, by the processor, the at least one sub-segment of the time-varying data based at least in part on the probability of the at least one candidate event of interest and at least one probability threshold value.

6. The method of claim 5, wherein the signature classification neural network comprises a two-dimensional (2D) convolutional neural network (CNN).

7. The method of claim 5, wherein the at least one Formant comprises:
an F0 Formant,
an F1 Formant, and
an F2 Formant.

8. The method of claim 1, wherein the signal data signature comprises a two-dimensional image representation of audio recorded in at least one audio file.

9. A system comprising:
at least one processor in communication with at least one non-transitory computer readable medium having software instructions stored thereon, wherein the at least one processor, upon execution of the software instructions, is configured to:
receive a signal data signature comprising time-varying data;
wherein the time-varying data comprises at least one candidate event of interest;
utilize a first trained Hidden Markov model (HMM) to segment the signal data signature into at least one segment of the time-varying data;
wherein the first trained HMM comprises first parameters that are trained and used by the first trained HMM to identify state changes indicative of events of interest within windows of historical time-varying data;
wherein the at least one segment of the time-varying data comprises a first length;
utilize a second trained Hidden Markov model (HMM) to segment the at least one segment of the time-varying data into at least one sub-segment of the time-varying data;
wherein the second trained HMM comprises second parameters that are trained and used by the second trained HMM to identify the state changes indicative of the events of interest within sub-windows of the windows of the historical time-varying data;
wherein the at least one sub-segment of the time-varying data comprises a second length;
output the at least one sub-segment of the time-varying data to represent at least one instance of the at least one candidate event of interest.

10. The system of claim 9, wherein the at least one processor, upon execution of the software instructions, is further configured to:
determine that the at least one segment of the time-varying data is greater than a threshold length; and
utilize, in response to the at least one segment of the time-varying data being greater than a threshold length, the second trained Hidden Markov model (HMM) to segment the at least one segment into the at least one sub-segment of the time-varying data.

11. The system of claim 10, wherein the threshold length comprises 5 seconds.

12. The system of claim 9, wherein the state changes is associated with at least one state comprises at least one of:
an event state associated with the events of interest,
a null state associated with no events, or
a noise state associated with events not of interest.

13. The system of claim 9, wherein the at least one processor, upon execution of the software instructions, is further configured to:
determine at least one Formant of the at least one sub-segment based at least in part on the time-varying data;
generate at least one sub-segment feature vector encoding the at least one Formant;
input the at least one sub-segment feature vector into a signature classification neural network to output a probability of the at least one candidate event of interest being at least one event of interest;
wherein the signature classification neural network comprises a plurality of trained classification parameters trained to model a correlation between a plurality of historical time-varying data and at least one event class representative of the at least one event of interest;
filter the at least one sub-segment of the time-varying data based at least in part on the probability of the at least one candidate event of interest and at least one probability threshold value.

14. The system of claim 13, wherein the signature classification neural network comprises a two-dimensional (2D) convolutional neural network (CNN).

15. The system of claim 13, wherein the at least one Formant comprises:
an F0 Formant,
an F1 Formant, and
an F2 Formant.

16. The system of claim 9, wherein the signal data signature comprises a two-dimensional image representation of audio recorded in at least one audio file.

17. A non-transitory computer readable medium having software instructions stored thereon, wherein, upon execution, the software instructions are configured to cause at least one processor to perform steps comprising:
receiving a signal data signature comprising time-varying data;
wherein the time-varying data comprises at least one candidate event of interest;
utilizing a first trained Hidden Markov model (HMM) to segment the signal data signature into at least one segment of the time-varying data;
wherein the first trained HMM comprises first parameters that are trained and used by the first trained HMM to identify state changes indicative of events of interest within windows of historical time-varying data;

wherein the at least one segment of the time-varying data comprises a first length;

utilizing a second trained Hidden Markov model (HMM) to segment the at least one segment of the time-varying data into at least one sub-segment of the time-varying data;

wherein the second trained HMM comprises second parameters that are trained and used by the second trained HMM to identify the state changes indicative of the events of interest within sub-windows of the windows of the historical time-varying data;

wherein the at least one sub-segment of the time-varying data comprises a second length;

outputting the at least one sub-segment of the time-varying data to represent at least one instance of the at least one candidate event of interest.

18. The non-transitory computer readable medium of claim 17, wherein, upon execution, the software instructions are further configured to cause the at least one processor to perform steps further comprising:

determining that the at least one segment of the time-varying data is greater than a threshold length; and utilizing, in response to the at least one segment of the time-varying data being greater than a threshold length, the second trained Hidden Markov model (HMM) to segment the at least one segment into the at least one sub-segment of the time-varying data.

19. The non-transitory computer readable medium of claim 17, wherein the state changes is associated with at least one state comprises at least one of:

an event state associated with the events of interest, a null state associated with no events, or a noise state associated with events not of interest.

20. The non-transitory computer readable medium of claim 17, wherein, upon execution, the software instructions are further configured to cause the at least one processor to perform steps further comprising:

determining at least one Formant of the at least one sub-segment based at least in part on the time-varying data;

generating at least one sub-segment feature vector encoding the at least one Formant;

inputting the at least one sub-segment feature vector into a signature classification neural network to output a probability of the at least one candidate event of interest being at least one event of interest;

wherein the signature classification neural network comprises a plurality of trained classification parameters trained to model a correlation between a plurality of historical time-varying data and at least one event class representative of the at least one event of interest;

filtering the at least one sub-segment of the time-varying data based at least in part on the probability of the at least one candidate event of interest and at least one probability threshold value.

* * * * *